(12) United States Patent
Koga et al.

(10) Patent No.: US 6,661,838 B2
(45) Date of Patent: *Dec. 9, 2003

(54) IMAGE PROCESSING APPARATUS FOR DETECTING CHANGES OF AN IMAGE SIGNAL AND IMAGE PROCESSING METHOD THEREFOR

(75) Inventors: Shinichiro Koga, Utsunomiya (JP); Yoshihiro Ishida, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/651,348

(22) Filed: May 22, 1996

(65) Prior Publication Data

US 2002/0044607 A1 Apr. 18, 2002

(30) Foreign Application Priority Data

May 26, 1995 (JP) .............................................. 7-128378
Feb. 9, 1996 (JP) .............................................. 8-024337

(51) Int. Cl.$^7$ .......................... H04B 1/66; H04N 7/137
(52) U.S. Cl. ...................................... 375/240; 348/155
(58) Field of Search ................................ 348/155, 154, 348/152, 143, 416, 402, 700, 701, 699, 702; 382/238, 236, 232; 375/240; H04N 7/137; H04B 1/66

(56) References Cited

U.S. PATENT DOCUMENTS 4,777,526 A * 10/1988 Saitoh et al. ................ 348/159
5,091,780 A * 2/1992 Pomerleau .................... 348/153
5,455,561 A * 10/1995 Brown ........................ 348/154
5,493,345 A * 2/1996 Ishikawa et al. ............. 348/403
5,502,482 A * 3/1996 Graham ....................... 348/700
5,528,313 A * 6/1996 Tanaka et al. ............... 348/699
5,548,346 A * 8/1996 Mimura et al. ............. 348/462
5,751,346 A * 5/1998 Dozier et al. ............... 348/153
5,909,252 A * 6/1999 Ueda et al. .................. 348/416

FOREIGN PATENT DOCUMENTS

GB 2282294 * 3/1995 ............ H04N/7/28
JP 62-147888 * 7/1987 ............ H04N/7/18
JP 63-5675 * 1/1988 ............ H04N/7/18

* cited by examiner

Primary Examiner—Chris Kelley
Assistant Examiner—Tung Vo
(74) Attorney, Agent, or Firm—Fitzpatrick, Cella, Harper & Scinto

(57) ABSTRACT

In one aspect, an image processing apparatus inputs an input image signal and detecting whether or not there is a frame change in an image by comparing the input image signal with a reference image signal. A memory is used for updating the reference image signal by storing the input image signal as the reference image signal in units of frames when there is a frame change. In another aspect, the image processing apparatus extracts change components between images by comparing the input image signal with the reference image signal, the reference image signal being an earlier input signal when a most recent prior change component was extracted. The extracted change components are corrected by detecting and removing an erroneously extracted change component, and an image change is discriminated in the input image signal on the basis of the change components as corrected.

6 Claims, 26 Drawing Sheets

IMAGE PROCESSING APPARATUS FOR DETECTING CHANGES OF AN IMAGE SIGNAL AND IMAGE PROCESSING METHOD THEREFOR

BACKGROUND OF THE INVENTION

1. Field of the Invention

The present invention relates to a motion image processing apparatus and method and, more particularly, to an image processing apparatus and method which can reduce transmission, storage, and display data amounts by detecting an image change and can be suitably used for an image transmission apparatus, an image storage device, and a motion image display device. That is, the present invention can be used for a monitoring apparatus for transmitting and storing images in a monitoring area, a video conference apparatus, a general-purpose computer or video server which handles motion images, and the like.

2. Related Background Art

In the field of monitoring, e.g., road monitoring and night monitoring, apparatuses which reduce the cost for monitoring by transmitting and monitoring images obtained by photographing a monitoring area with a TV camera or storing the images in a storage device have been used. In this case, the transmission and storage data amounts are reduced by detecting an image change and outputting image data only when an image change occurs.

In recent years, image data are exchanged and stored between remote places via a communication network such as a WAN (Wide Area Network) or a LAN (Local Area Network) in many instances, like a video conference, without the intention of monitoring. In addition, with an improvement in the performance of a general-purpose computer, the computer can transmit and store motion images as well as displaying motion images.

Since image data amounts too much, a dedicated device is required to perform detection processing an image change at a speed as high as that of image processing. If there is no such a dedicated device, an image temporarily stored is processed for a long period of time.

Recently, however, image data is transmitted, stored, or displayed by using a general-purpose computer in many instances. For example, video conference systems using general-purpose computers have become popular, as described above. Demands have therefore arisen for a method of performing detection processing of an image change at a speed as high as that of image processing without using any dedicated device.

Various methods associated with the above image change detection method have been proposed. A relatively easy method is a method of detecting a change area by obtaining a difference between two images. According to this easy method, even a general-purpose computer can execute detection processing at a sufficient processing speed.

As methods of detecting a change area on the basis of a difference between two images, typical methods are a method of detecting a change area on the basis of a difference between a background image photographed in advance and a currently photographed image, and a method of detecting a change area on the basis of a difference between two frames adjacent to each other along the time base.

There has been proposed an apparatus based on the latter method of detecting a change area on the basis of a difference between frames to record images in a monitoring area on a VTR, wherein an image change is detected and an image is recorded on the VTR only when the image change occurs.

Many limitations are, however, imposed on the use of the method of detecting a change area on the basis of a difference between a background image and a current image. For example, a background image having no moving object must be prepared.

According to the method of detecting a change area on the basis of a difference between frames adjacent to each other along the time base, when an image change is moderate, the difference is small. In this case, therefore, it is difficult to detect a change area.

Furthermore, in the method of detecting a change area on the basis of a difference between images, erroneous detection of a change area tends to occur because of flickering of the light source or mixing of noise in a photoelectric scanning unit or an electronic circuit unit, and the like.

SUMMARY OF THE INVENTION

The present invention has been made in consideration of the above situation, and has as its object to easily and reliably detect an image change at a sufficiently high processing speed without using any dedicated device.

In order to achieve the above object, according to an aspect of the present invention, there is provided an image processing apparatus (method) including input means (step) for inputting a continuous image signal, detection means (step) for detecting a frame change in an image by comparing the image signal input by the input means (step) with a reference image signal, and storage means (step) for updating/storing the image signal input by the input means (step) as the reference image signal in units of frames in accordance with an output from the detection means (step).

It is another object of the present invention to accurately detect an image change without being affected by change areas (erroneously detected small areas dispersing randomly, in particular) erroneously detected because of flickering of a light source or mixing of noise in a photoelectric scanning unit, an electronic circuit unit, or the like.

In order to achieve the above object, according to another aspect of the present invention, there is provided an image processing apparatus (method) including input means (step) for inputting a continuous image signal, change component extraction means (step) for extracting change components between images by comparing the image signal input by the input means (step) with a reference image signal, erroneous extraction correction means (step) for detecting and removing an erroneously extracted change component from the change components extracted by the change component extraction means (step), and image change discrimination means (step) for discriminating an image change in the image signal on the basis of the change component corrected by the erroneous extraction correction means (step).

Other objects, features and advantages of the invention will become apparent form the following detailed description taken in conjunction with the accompanying drawings.

DETAILED DESCRIPTION OF THE PREFERRED EMBODIMENTS

An embodiment of the present invention will be described below with reference to the accompanying drawings.

Figure 1:
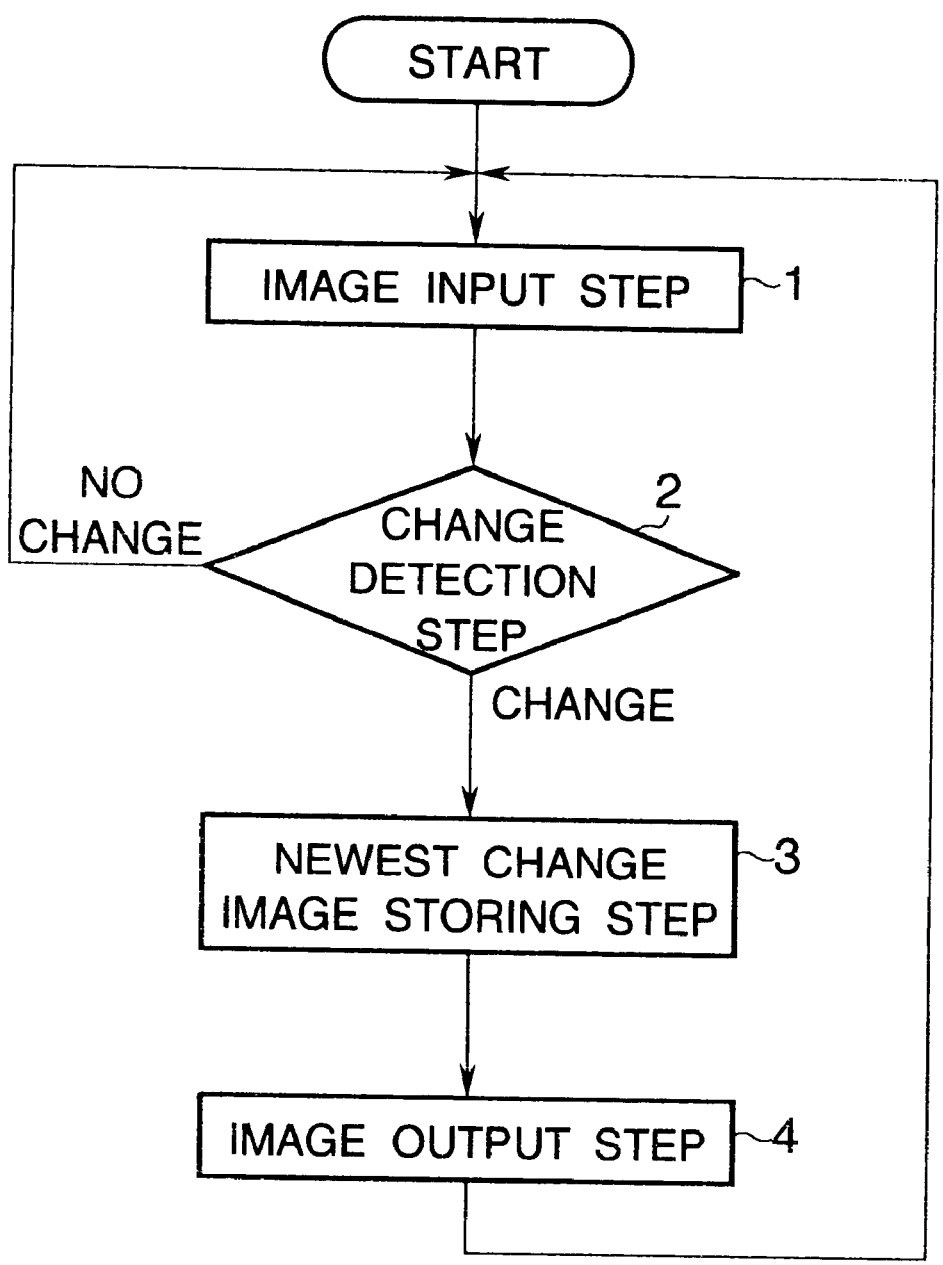
FIG. 1 is a flow chart showing the contents of an image processing method according to the first to fourth embodiments of the present invention.

FIG. 1 is a flow chart showing the contents of a motion image processing method according to the first embodiment. Referring to FIG. 1, in image input step 1, a still image is extracted from an image obtained by performing a photographing operation with a video camera or the like (not shown), a digital motion image stored in a disk unit (not shown), or the like, and the extracted image is input (this input still image will be referred to as an input image hereinafter).

In change detection step 2, the input image input in image input step 1 and an image (to be referred to as a newest change image hereinafter) obtained when the newest change of several image changes caused in the past are compared with each other to detect a current image change. When an image change is detected, the flow advances to newest change image storage step 3. If no image change is detected, the flow returns to image input step 1.

In newest change image storage step 3, the input image as an object to be compared when the image change is detected in change detection step 2 is stored as a newest change image. In image output step 4, the input image obtained when the image change is detected in change detection step 2 is output to a communication path (not shown) (e.g., a WAN or LAN) to transmit it. Alternatively, the input image is output to an image storage device (not shown) to be stored, or is output to an image display device (not shown) to be displayed.

When the processing in image output step 4 is completed, the flow returns to image input step 1 again to repeatedly execute the above processing unless the end of the processing is designated.

Figure 2:
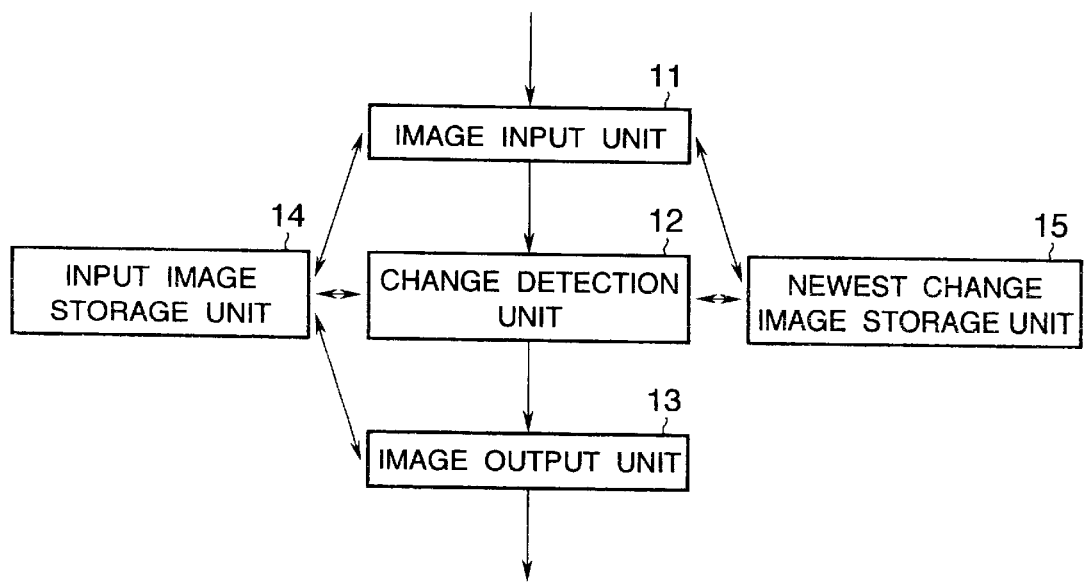
FIG. 2 is a block diagram showing an example of the arrangement of a motion image processing apparatus for performing the processing in FIG. 1.
Figure 3:
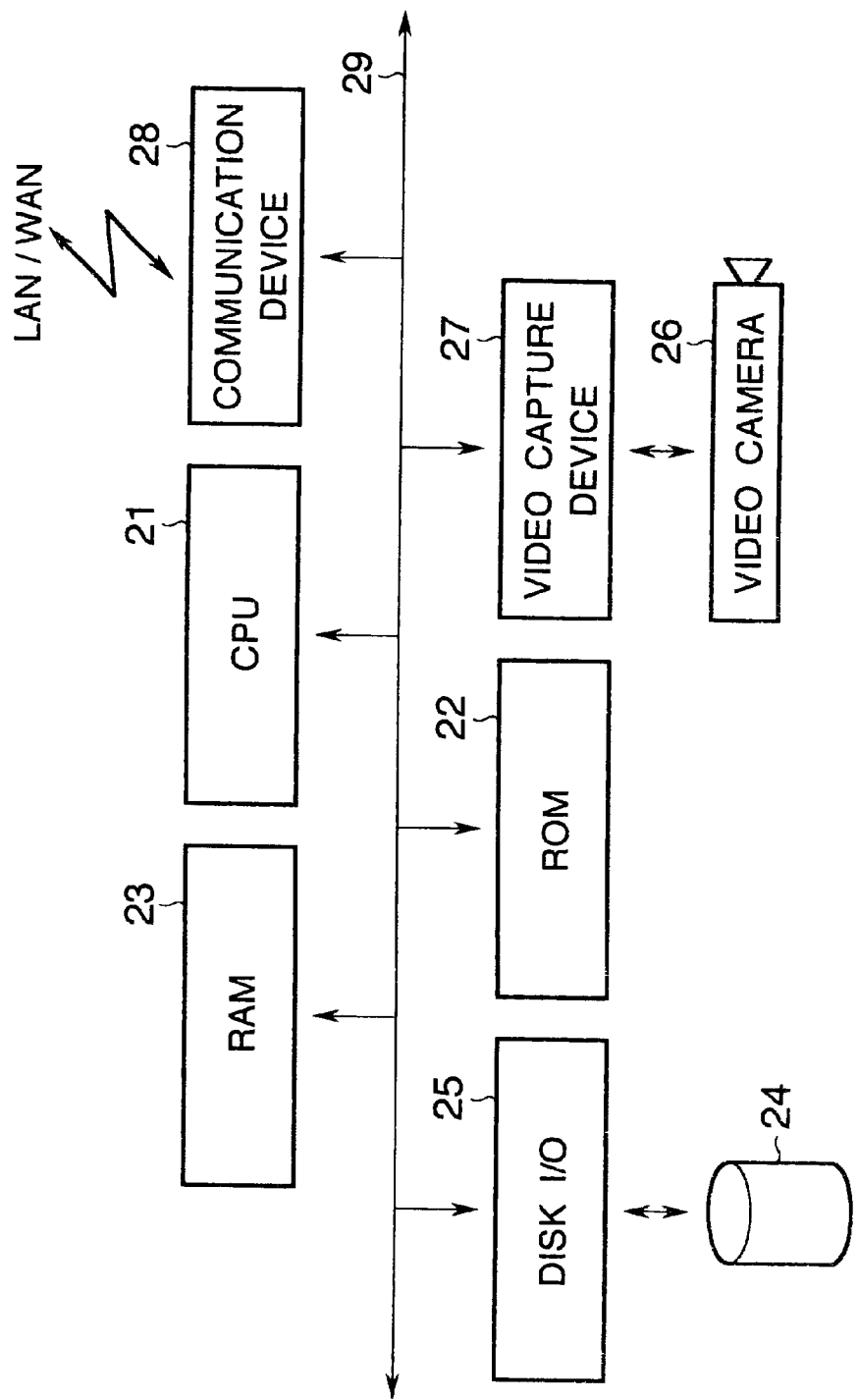
FIG. 3 is a block diagram showing an example of the actual hardware arrangement for realizing the functions in FIG. 2.

FIG. 2 is a block diagram showing an example of the arrangement of an image processing apparatus for performing the processing in FIG. 1. FIG. 3 shows an example of the arrangement of hardware for realizing the functions in FIG. 2.

Referring to FIG. 3, a CPU (Central Processing Unit) 21 controls the overall operation of the motion image processing apparatus of this embodiment. A ROM (Read-Only Memory) 22 stores various processing programs. A RAM (Random Access Memory) 23 stores various kinds of information during processing.

A disk unit 24 stores information such as digital motion image information. A disk input/output device (disk I/O) 25 inputs/outputs digital motion image information stored in the disk unit 24. A video camera 26 acquires image information by photographing an object to be photographed. A video capture device 27 captures a still image from an image obtained by the video camera 26.

A communication device 28 transmits a still image input from the disk unit 24 via the disk I/O 25, or transmits a still image, input from the video camera 26 via the video capture device 27, via a communication path such as a WAN or LAN. The CPU 21, the ROM 22, the RAM 23, the disk I/O 25, the video capture device 27, and the communication device 28 are connected to a bus 29.

Referring to FIG. 2, an image input unit 11 acquires a still image from an image obtained by the video camera, a digital motion image stored in the disk unit, or the like. An input image storage unit 14 stores the still image.

Referring to FIG. 3, for example, the image input unit 11 may be constituted by a known image input unit which causes the video capture device 27 to acquire a still image (input image) from an image, obtained by performing a photographing operation with the video camera 26, and stores the still image in the RAM 23 under the control of the CPU 21 which operates in accordance with programs stored in the ROM 22 or the RAM 23.

Alternatively, the image input unit 11 may be constituted by a known image input unit which reads, via the disk I/O 25, a still image (input image) from a digital motion image stored in the disk unit 24, and stores the read image in the RAM 23 under the control of the CPU 21 which operates in accordance with programs stored in the ROM 22 or the RAM 23.

Although not shown in FIG. 3, the image input unit 11 may be constituted by a known image input unit which causes a digital still camera to photograph a still image, and stores the image in the RAM 23 under the control of the CPU 21 which operates in accordance with programs stored in the ROM 22 or the RAM 23. As is apparent, the image input unit 11 may be constituted by a combination of the above plurality of image input units.

A change detection unit 12 compares an input image stored in the input image storage unit 14 with an newest change image stored in a newest change image storage unit 15 to detect a current image change. When an image change is detected, the input image stored in the input image storage unit 14 is stored as a newest change image in the newest change image storage unit 15.

For example, as shown in FIG. 3, the change detection unit 12 can be constituted by the CPU 21 which operates in accordance with programs stored in the ROM 22 or the RAM 23, and the RAM 23 used as a work memory or the disk unit 24. As is apparent, the change detection unit 12 may be constituted by a dedicated CPU, a dedicated RAM, and a dedicated disk unit, or dedicated hardware.

An image output unit 13 outputs and transmits, to a communication path (a WAN or LAN), an input image which is stored in the input image storage unit 14 when the change detection unit 12 detects an image change, outputs and stores the image in the image storage device, or outputs the image to the image display device to display it.

For example, referring to FIG. 3, the image output unit 13 can be constituted by a known image output unit which transmits an image to a communication path such as a WAN or LAN via the communication device 28 under the control of the CPU 21 which operates in accordance with programs stored in the ROM 22 or the RAM 23.

Alternatively, the image output unit 13 my be constituted by a known image output unit which stores part of a digital motion image in the disk unit 24 under the control of the CPU 21 which operates in accordance with programs stored in the ROM 22 or the RAM 23. In this case, the disk unit 24 may be a unit which can be used via a network such as a LAN.

Although not shown in FIG. 3, the image output unit 13 may be constituted by a known image output unit which continuously displays still images on the same portion on a display to display a motion image. As is apparent, the image output unit 13 may be constituted by a combination of the above plurality of image output units.

For example, referring to FIG. 3, the input image storage unit 14 and the newest change image storage unit 15 may be constituted by the RAM 23 or the disk unit 24. As is apparent, each unit may be constituted by a dedicated storage device.

Figure 4:
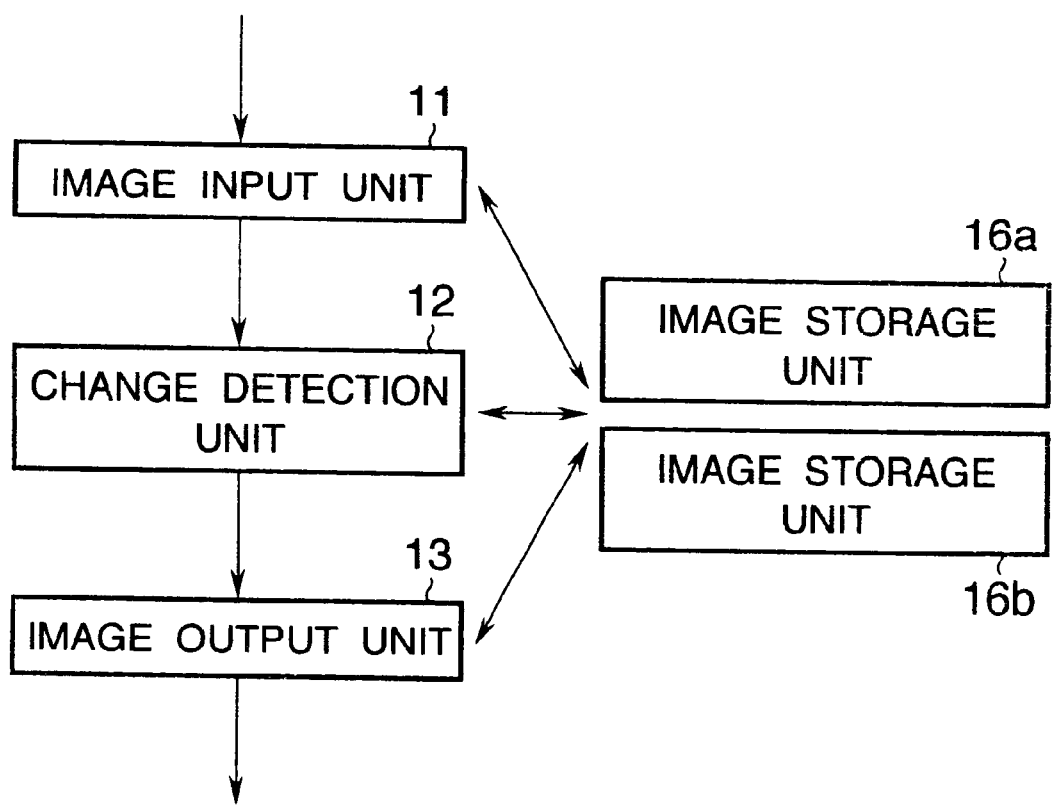
FIG. 4 is a block diagram showing another example of the arrangement of the motion image processing apparatus for performing the processing in FIG. 1.

Note that the input image storage unit 14 and the newest change image storage unit 15 may be constituted by two image storage units 16a and 16b which are selectively used upon a switching operation, as shown in FIG. 4. In this arrangement, every time an image change is detected by the change detection unit 12, the roles of the image storage units 16a and 16b are switched in newest change image storage step 3 in FIG. 1.

Assume that an image change is detected at a certain time point in the process of sequentially storing an input image in the image storage unit 16a. In this case, the image storage unit 16a is switched to serve as a storage unit for storing a newest change image, whereas the image storage unit 16b is switched to serve as a storage unit for storing an input image.

With this operation, the input image stored in the image storage unit 16a when the image change is detected is used as a newest change image afterward, and the processing of copying an input image from the input image storage unit 14 to the newest change image storage unit 15 in the case shown in FIG. 2 can be omitted.

Note that the image storage units 16a and 16b need not be used as separate memories, but the above function can be realized by one memory with a bank switching operation.

The processing contents in each step in FIG. 1 will be described in detail with reference to the arrangements of FIGS. 2 and 3.

In image input step 1, the image input unit 11 acquires a still image from an image obtained by the video camera 26 or a digital motion image stored in the disk unit 24. Alternatively, the image input unit 11 photographs a still image using a digital still camera (not shown), and stores the still image in the input image storage unit 14.

In change detection step 2, the input image stored in the input image storage unit 14 is compared with the newest change image stored in the newest change image storage unit 15 to detect a current image change.

Figure 5:
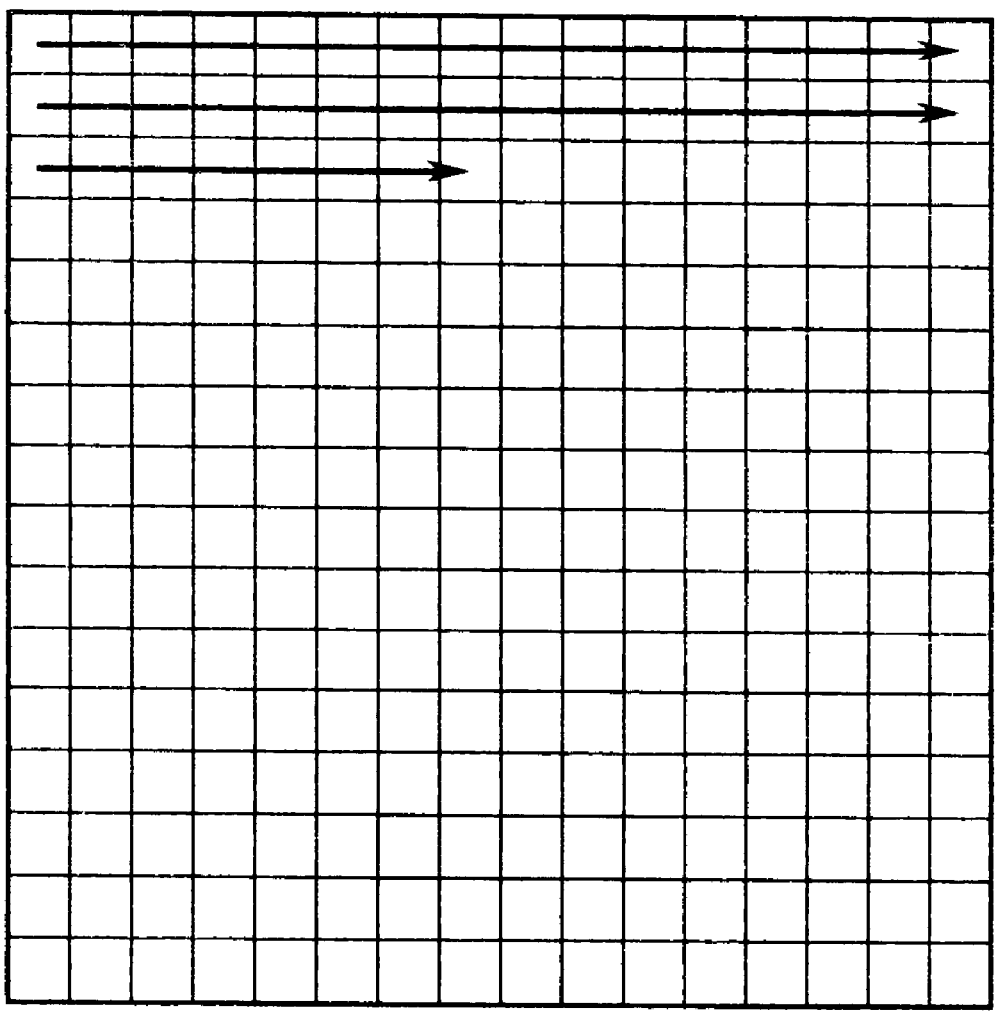
FIG. 5 is a view for explaining a pixel processing order in detecting an image change in the first and second embodiments.

FIG. 5 shows an example of the contents of processing executed by the CPU 21 in accordance with programs stored in the ROM 22 or the RAM 23 in FIG. 3 in change detection step 2. In this processing, the pixel value difference (absolute value) between each pair of corresponding pixels is calculated using an input image and a newest change image. If the total pixel value difference of the entire image is equal to or larger than a given value, it is determined that the input image changes from the newest change image. That is, it is determined that an image change has occurred.

In this case, pixel value differences are calculated by processing the respective pixels of an image in the raster scan order, as shown in FIG. 5. The total pixel value difference during processing will be referred to as a total change amount. As is apparent, pixels may be processing concurrently.

Figure 6:
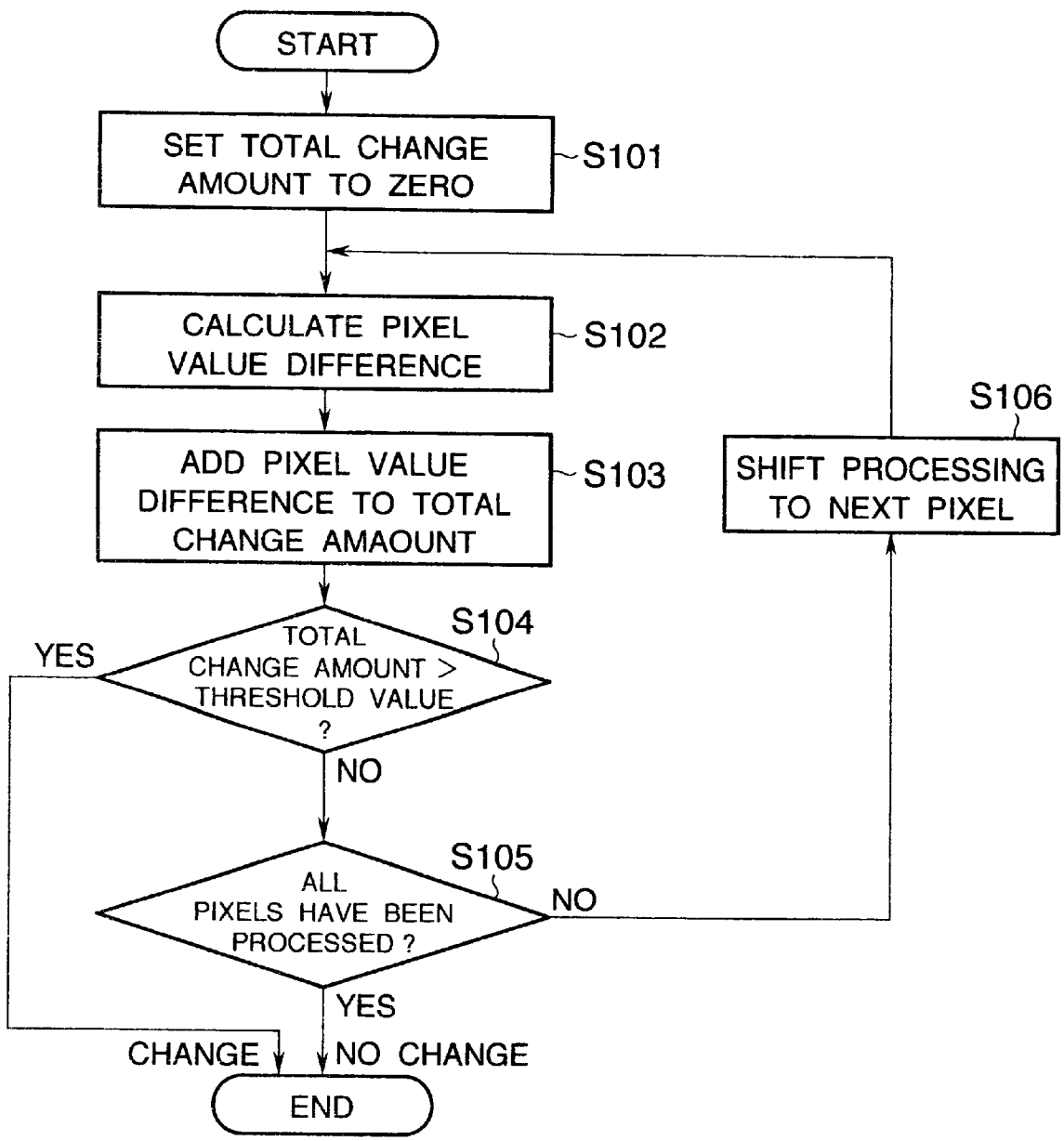
FIG. 6 is a flow chart showing the processing in the image change detection step in the first embodiment.

Referring to FIG. 6, in step S101, the total change amount is initialized to 0. In step S102, the pixel value between currently processed pixels (to be referred to as subject pixels hereinafter) is calculated.

Assume that an input image is a binary image. In this case, the value of a pixel value difference is "1" if subject pixels have difference values, and is "0" if the subject pixels have the same value. If an input image is a halftone image, the value of a pixel value difference is the absolute value of the difference between subject pixel values. If an input image is a color image, the value of a pixel value difference is a value obtained by calculating the absolute values of the differences between R, G, and B values of subject pixels, and calculating the sum of the absolute values of the differences.

In step S103, the pixel value difference calculated in step S102 is added to the total change amount. In step S104, it is checked whether the total change amount calculated in step S103 is larger than a predetermined value (threshold value). If YES in step S104, it is determined that an image change has occurred, and the processing shown in FIG. 6 is terminated. If NO in step S104, the flow advances to step S105.

In step S105, it is checked whether all pixels have been processed. If YES in step S105, it is determined that no image change has occurred, and the processing in FIG. 6 is terminated. If NO in step S105, the flow advances to step S106. In step S106, processing is shifted to the next pixel (the next pixel is set as a subject pixel), and the flow return to step S102.

In newest change image storage step 3, when an image change is detected in change detection step 2, the input image stored in the input image storage unit 14 in image input step 1 is stored as a newest change image in the newest change image storage unit 15.

In image output step 4, when an image change is detected in change detection step 2, the input image stored in the input image storage unit 14 is output and transmitted to a communication path (a WAN or LAN) via the communication device 28 or the like, output to the disk unit 24 or the like to be stored, or output to an image display device (not shown) to be displayed.

As described above, according to the first embodiment, an image which undergoes no change, e.g., a background image, need not be prepared as the above comparative image, and even a moderate image change can be reliably detected.

An image change can therefore be easily and reliably detected at a sufficiently high speed without any dedicated device. In addition, only when an image change is detected, the corresponding image data is output. With this operation, the image data amount can be reduced in outputting the image data. For example, only an image corresponding to a detected change is output to a communication path, a storage unit, or a display device to reduce the transmission, storage, or display data amount.

Figure 16:
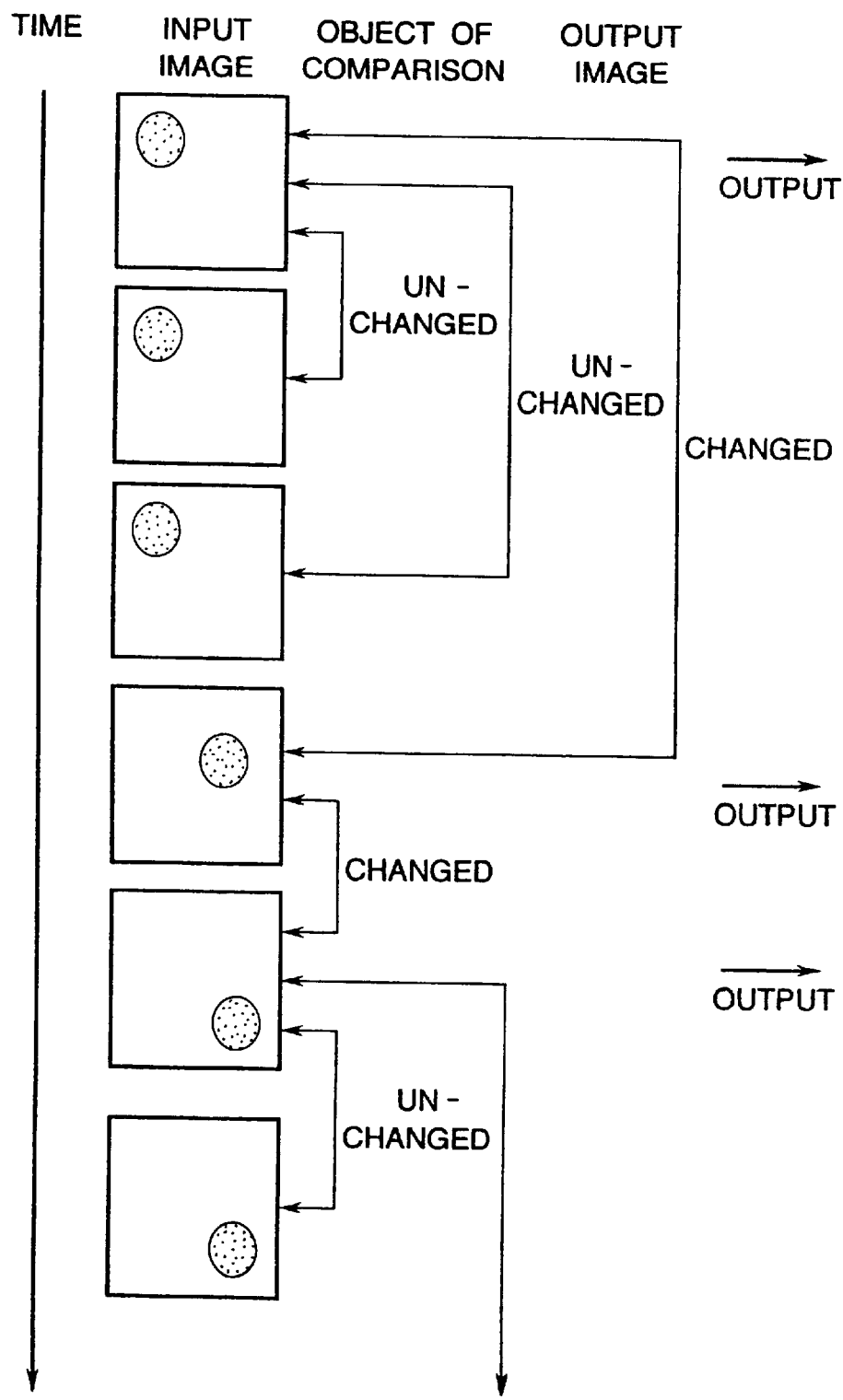
FIG. 16 is a view showing an outline of a motion image processing method to which the present invention is applied.

FIG. 16 shows an outline of the motion image processing method of the present invention.

The second embodiment of the present invention will be described next.

The second embodiment is another embodiment of the processing in change detection step 2 in the first embodiment.

Figure 7:
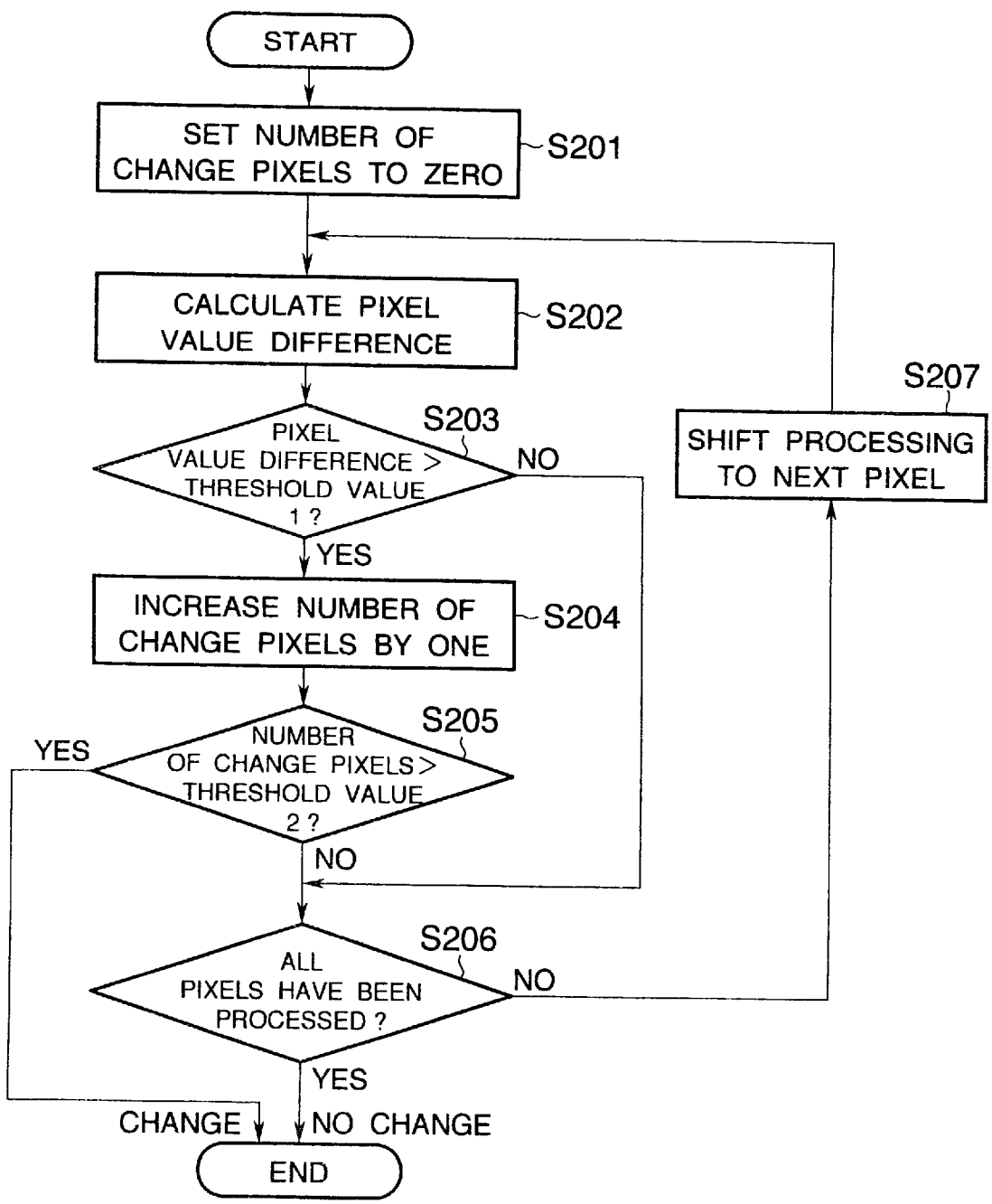
FIG. 7 is a flow chart showing the processing in the image change detection step in the second embodiment.

FIG. 7 shows an example of the contents of processing executed by the CPU 21 in change detection step 2 in this embodiment in accordance with programs stored in the ROM 22 or the RAM 23 in FIG. 3.

In this processing, the pixel value difference (absolute value) between each pair of corresponding pixels is calculated using an input image and a newest change image. If the value of each pixel value difference is equal to or larger than a given value (first threshold value), it is determined that the subject pixel has changed (a pixel having undergone a change will be referred to as a change pixel hereinafter). If the number of change pixels of the entire input image is equal to or larger than a given value (second threshold value), it is determined that the input image has changed as compared with the newest change image. That is, it is determined that an image change has occurred.

Similar to the first embodiment, as shown in FIG. 5, the above determination of a change pixel is performed by processing the respective pixels of an image in the raster scan order. Note that the total number of change pixels during processing will be referred to as the number of change pixels. As is apparent, pixels may be processed concurrently.

Referring to FIG. 7, in step S201, the number of change pixels is initialized. In step S202, the pixel value difference between subject pixels which are currently processed is calculated by the same method as in the first embodiment.

In step S203, it is checked whether the pixel value difference calculated in step S202 is larger than a predetermined value (first threshold value). If YES in step S202, it is determined that a subject pixel has undergone a change, and the flow advances to step S204 to increase the number of change pixels by one. If NO in step S202, it is determined that the subject pixel has undergone no change, and the flow jumps to step S206.

In step S205 after step S204, it is checked whether the number of change pixels calculated in step S204 is larger than a predetermined value (second threshold value). If YES in step S205, it is determined hat an image change has occurred, and the processing in FIG. 7 is terminated. If NO in step S205, the flow advances to step S206.

In step S206, it is checked whether all pixels have been processed. If YES in step S206, it is determined that no image change has occurred, and the processing in FIG. 7 is terminated. IF NO in step S206, the flow advances to step S207. In step S207, processing is shifted to the next pixel (the next pixel is set as a subject pixel), and the flow returns to step S202.

Similar to the first embodiment, in the second embodiment, an image change can be easily and reliably detected at a sufficiently high speed even without any dedicated device. In addition, only when an image change is detected, the corresponding image data is output to a communication path, a storage unit, or a display device. With this operation, the transmission, storage, or display data amount can be reduced.

The third embodiment of the present invention will be described next.

The third embodiment is still another embodiment of the processing in change detection step 2 in the first embodiment described above.

Figure 8:
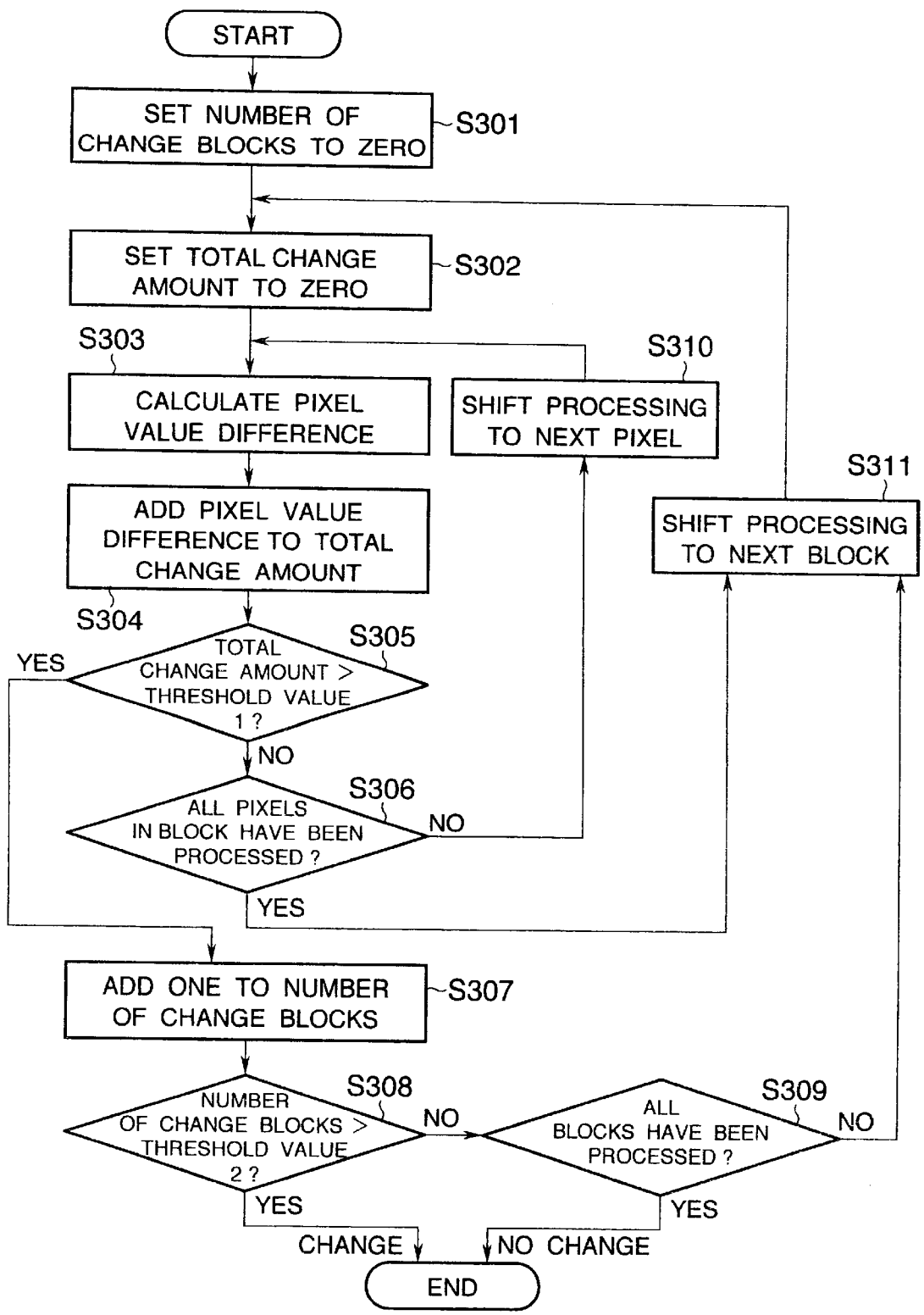
FIG. 8 is a flow chart showing the processing in the image change detection step in the third embodiment.

FIG. 8 shows an example of the contents of processing executed by the CPU 21 in accordance with programs stored in the ROM 22 or the RAM 23 in FIG. 3 in change detection step 2 in this embodiment.

Figure 9A:
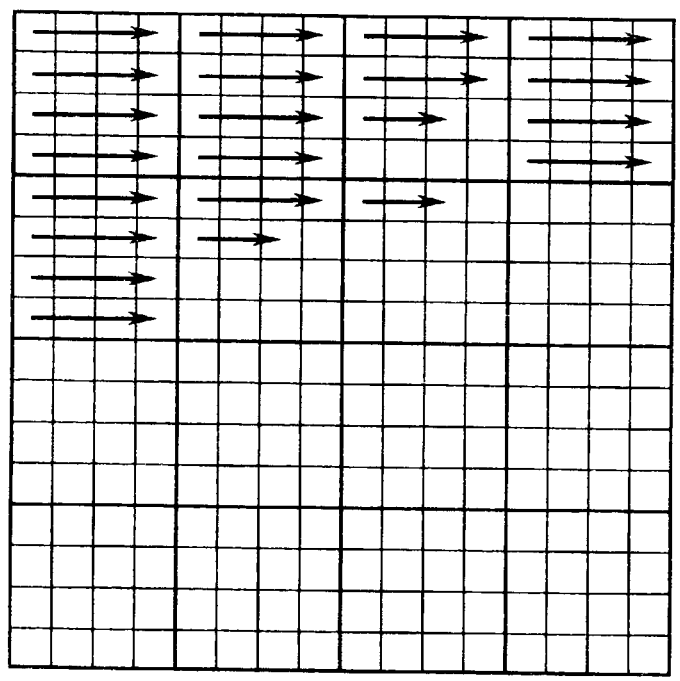
FIGS. 9A and 9B are views for explaining an example of how an image is divided into blocks, a pixel processing order, and a block processing order in the third and fourth embodiments.
Figure 9B:
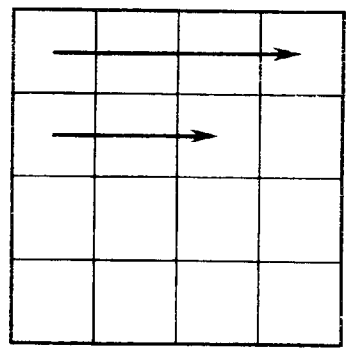

In this processing, as shown in FIGS. 9A and 9B, an input image and a newest change image are divided into a plurality of blocks, and an image change is detected in units of blocks. Similar to the first embodiment, the pixel value difference between each pair of corresponding pixels is calculated using the input image and the newest change image. If the total pixel value difference in each block is larger than a given value (first threshold value), it is determined that an image change has occurred in the corresponding block.

If the number of blocks having undergone changes (to be referred to as change blocks hereinafter) of the entire input image is larger than a given value (second threshold value), it is determined that the input image has changed as compared with the newest change image. That is, it is determined that an image change has occurred.

Assume that pixel value differences in each block are calculated by processing the respective pixels in the raster scan order, as shown in FIG. 9A. Assume also that the respective blocks are processed in the raster scan order, as shown in FIG. 9B. Note that the total pixel value difference in a block which is being processed will be referred to as a total change amount; and the total number of change blocks, the number of change blocks. As is apparent, pixels or blocks may be processed concurrently.

Referring to FIG. 8, in step S301, the number of change blocks is initialized to 0. In step S302, the total change amount is initialized to 0. In step S303, the pixel value difference between subject pixels is calculated by the same method as that in the first embodiment. In step S304, the pixel value difference calculated in step S303 is added to the total change amount.

In step S305, it is checked whether the total change amount calculated in step S304 is larger than a predetermined value (first threshold value). If YES in step S305, it is determined that a change has occurred in the subject block, and the flow advances to step S307 to add one to the number of change blocks. If NO in step S305, the flow advances to step S306.

In step S306, it is checked whether all the pixels in a subject block have been processed. If YES in step S306, it is determined that no change has occurred in the subject block, the flow advances to step S311 to shift processing to the next block (the next block is set as a subject block), and the flow returns to step S302. If NO in step S306, the flow advances to step S310 to shift processing to the next pixel (the next pixel is set as a subject pixel), and the flow returns to step S303.

In step S308 following step S307, it is checked whether the number of change blocks calculated in step S307 is larger than a predetermined value (second threshold value). If YES step S308, it is determined that an image change has occurred, and the processing in FIG. 8 is terminated. If NO in step S308, the flow advances to step S309.

In step S309, it is checked whether all blocks have been processed. If YES in step S309, it is determined that no image change has occurred, and the processing in FIG. 8 is terminated. If NO in step S309, the flow advances to step S311 to shift processing to the next block, and the flow returns to step S302.

Figure 10:
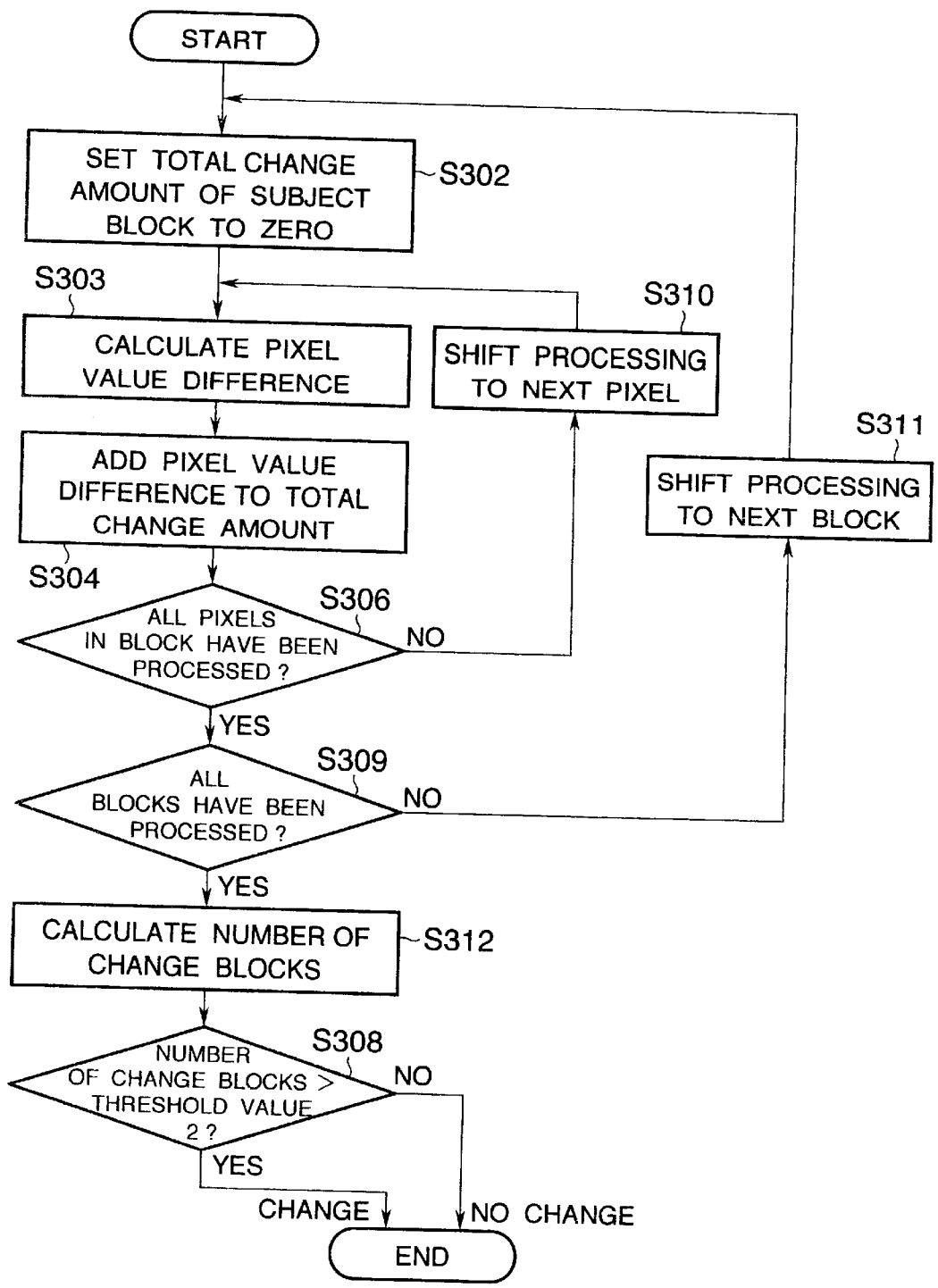
FIG. 10 is a flow chart showing another example of the processing in the image change detection step in the third embodiment.

Note that the purpose of this processing is to detect the presence/absence of an image change. For this reason, when the number of change blocks exceeds the second threshold value, the processing is terminated. However, as shown in the flow chart of FIG. 10, processing may be continued up to the last block.

With this operation, although the processing amount increases, all change blocks in an entire image can be detected. By transmitting, storing, or displaying only the change blocks, the transmission, storage, or display data amount can be reduced.

The fourth embodiment of the present invention will be described next.

The fourth embodiment is still another embodiment of the processing in change detection step 2 in the first embodiment described above.

Figure 11:
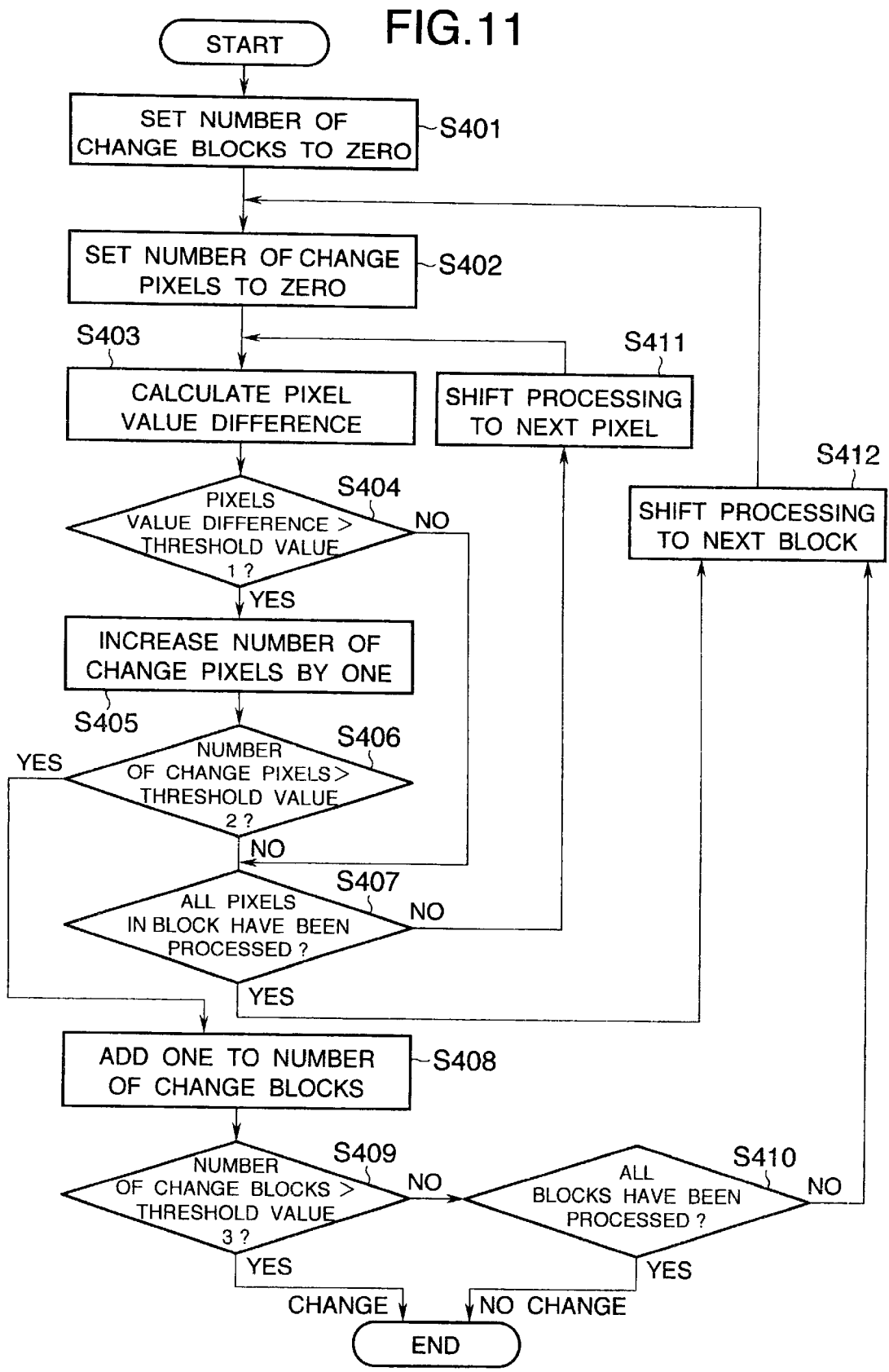
FIG. 11 is a flow chart showing the processing in the image change detection step in the fourth embodiment.

FIG. 11 shows an example of the contents of processing executed by the CPU 21 in accordance with programs stored in the ROM 22 or the RAM 23 in FIG. 3 in change detection step 2 in this embodiment.

In this processing, as shown in FIGS. 9A and 9B, an input image and a newest change image are divided into a plurality of blocks, and an image change is detected in units of blocks. Similar to the second embodiment, the pixel value difference between each pair of corresponding pixels is calculated using the input image and the newest change image. If the value of each pixel value difference is larger than a given value (first threshold value), it is determined that the subject pixels have undergone a change.

If the number of change pixels in each block is larger than a given value (second threshold value), it is determined that the corresponding block has undergone a change. If the number of change blocks in the entire input image is larger than a given value (third threshold value), it is determined that the input image has changed as compared with the newest change image. That is, it is determined that an image change has occurred.

Similar to the third embodiment, pixel value differences in each block are calculated by processing the respective pixels in the raster scan order, as shown in FIG. 9A, and the respective blocks are also processed in the raster scan order, as shown in FIG. 9B. Note that the total number of change pixels in a block which is being processed will be referred to as the number of change pixels; and the total number of change blocks, the number of change blocks. As is apparent, pixels or blocks may be processed concurrently.

Referring to FIG. 11, in step S401, the number of change blocks is initialized to 0. In step S402, the number of change pixels is initialized to 0. In step S403, the pixel value difference between subject pixels is calculated by the same method as that in the first embodiment.

In step S404, it is checked whether the pixel value difference calculated in step S403 is larger than a predetermined value (first threshold value). If YES in step S404, it is determined that the subject pixels have undergone a change, and the flow advances to step S405 to add one to the number of change pixels. If NO in step S404, it is determined that the subject pixels have undergone no change, and the flow jumps to step S407.

In step S406 following step S405, it is checked whether the number of change pixels calculated in step S405 is larger than a predetermined value (second threshold value). If YES in step S406, it is determined that the subject block has undergone a change, and the flow jumps to step S408 to add one to the number of change blocks. If NO in step S406, the flow advances to step S407.

In step S407, it is checked whether all the pixels in the subject block have been processed. If YES in step S407, it is determined that the subject block has undergone no change, and the flow advances to step S412 to shift processing to the next block (the next block is set to be a subject block), and the flow returns to step S402. If NO in step S407, the flow advances to step S411 to shift processing to the next pixel (the next pixel is set to be a subject pixel), and the flow returns to step S403.

In step S409 following step S408, it is checked whether the number of change blocks calculated in step S408 is larger than a predetermined value (third threshold value). If YES in step S409, it is determined that an image change has occurred, and the processing in FIG. 11 is terminated. If NO in step S409, the flow advances to step S410.

In step S410, it is checked whether all blocks have been processed. If YES in step S410, it is determined that no image change has occurred, and the processing in FIG. 11 is terminated. If NO in step S410, the flow advances to step S412 to shift processing to the next block, and the flow returns to step S402.

Figure 12:
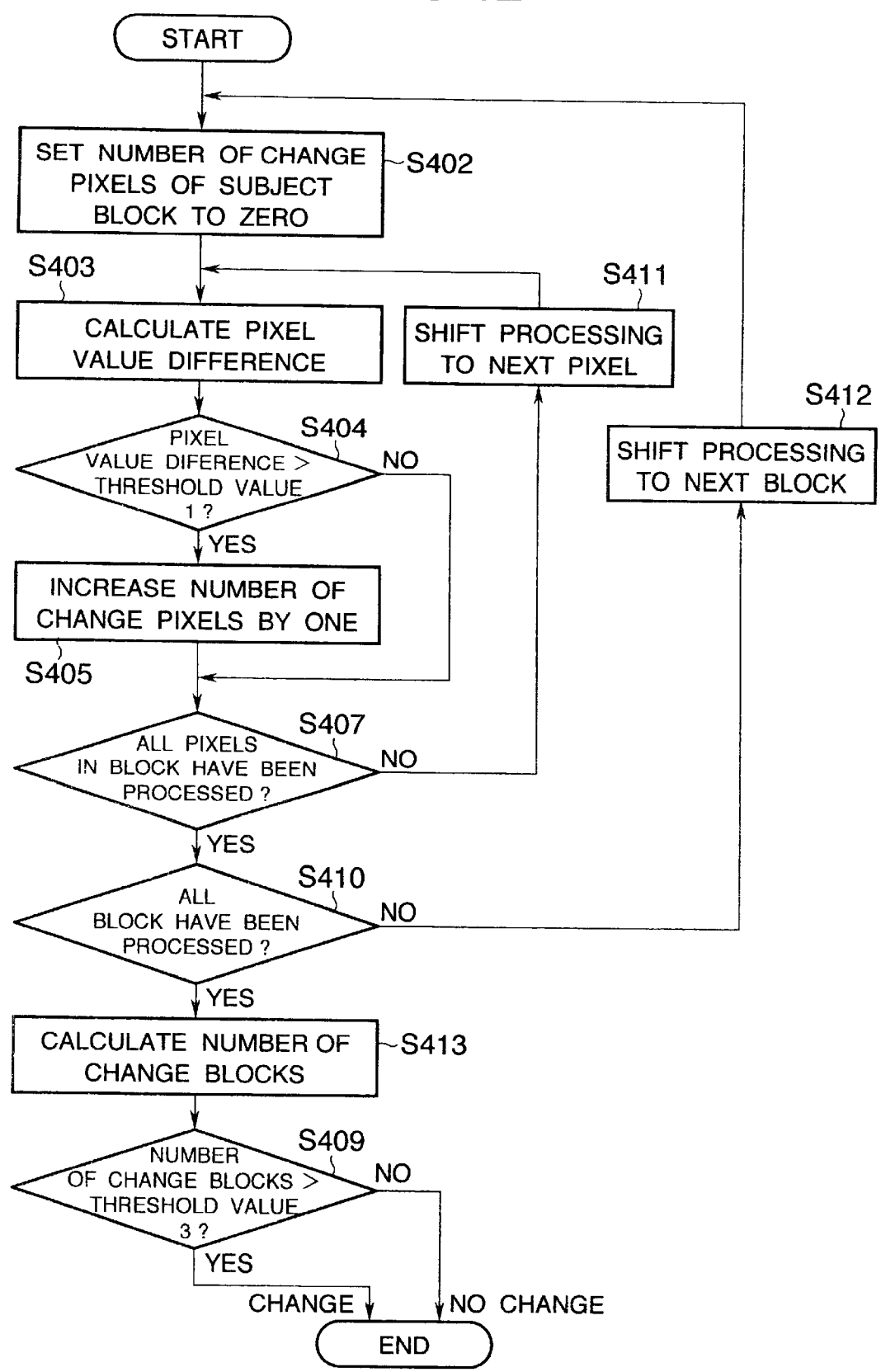
FIG. 12 is a flow chart showing another example of the processing in the image change detection step in the fourth embodiment.

Note that the purpose of this processing is to detect the presence/absence of an image change, as in the third embodiment. For this reason, when the number of change blocks exceeds the third threshold value, the processing is terminated. However, as shown in the flow chart of FIG. 12, the processing can be continued up to the last block. By transmitting, storing, or displaying only detected change blocks, the transmission, storage, or display data amount can be reduced as in the third embodiment.

The fifth embodiment of the present invention will be described next.

In the fifth embodiment, differential image forming step 5 is inserted between image input step 1 and change detection step 2 in the procedure in FIG. 1 in the first to fourth embodiments.

In differential image forming step 5, differential processing using, e.g., a Sobel operator, is performed for an input image input in image input step 1 (an image having undergone differential processing will be referred to as a differential image hereinafter). Other processing steps 1 to 4 are performed in the same manner as in the first to fourth embodiments. However, in change detection step 2, the same processing as that in the first to fourth embodiment is performed not for an input image but for a differential image. In addition, in newest change image storage step 3, a differential image is stored instead of an input image.

With this operation, although the processing is complicated, the apparatus can be designed not to detect an image change due to a change in illumination. In some application of the present invention, it is preferable that an image change due to a change in illumination be not detected. A similar effect can be expected in the first to fourth embodiments as well depending on a method of setting threshold values. In this embodiment, however, there is no need to consider a change in illumination in setting a threshold value.

Figure 13:
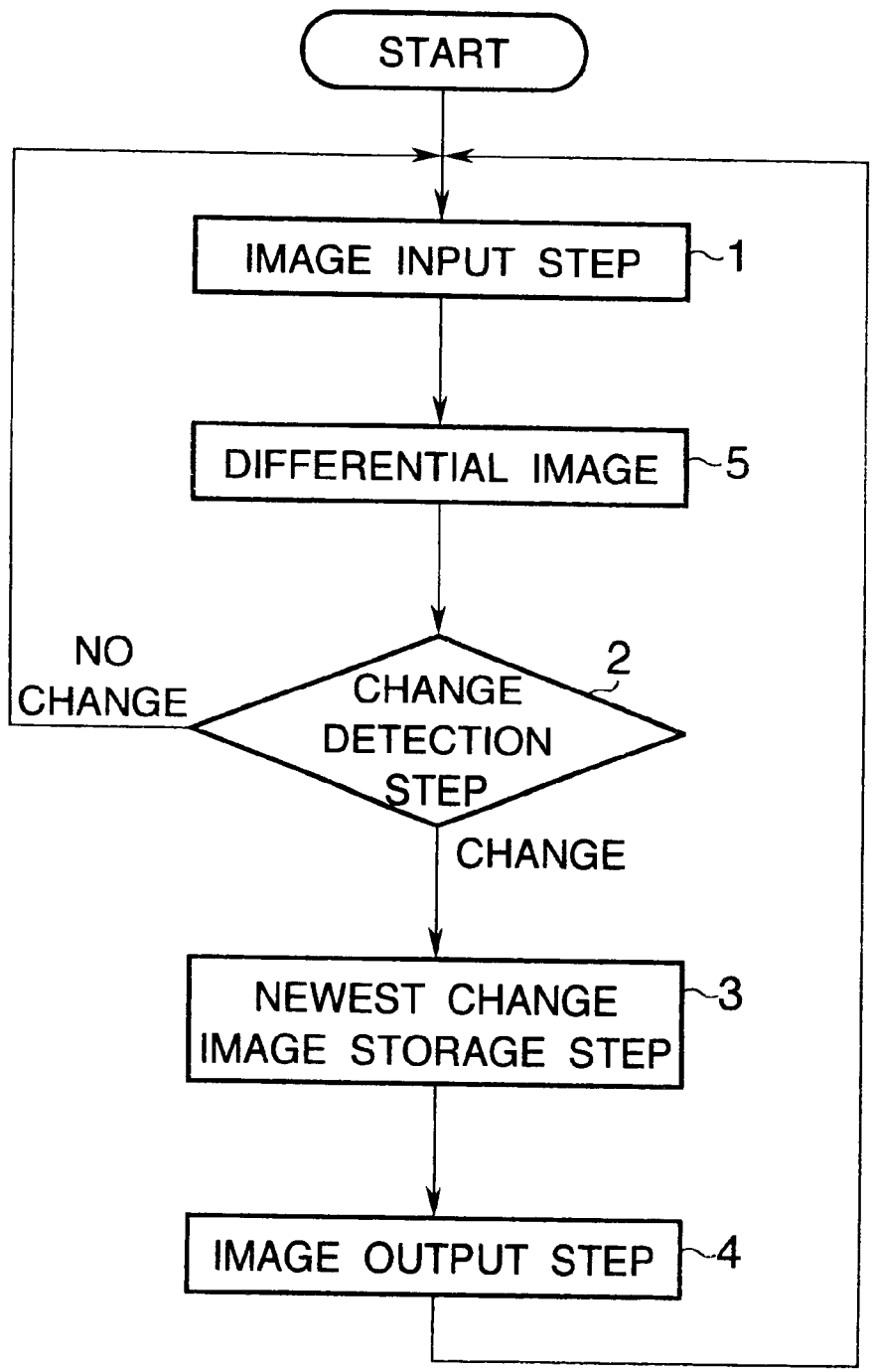
FIG. 13 is a flow chart showing the contents of an image processing method according to the fifth embodiment of the present invention.
Figure 14:
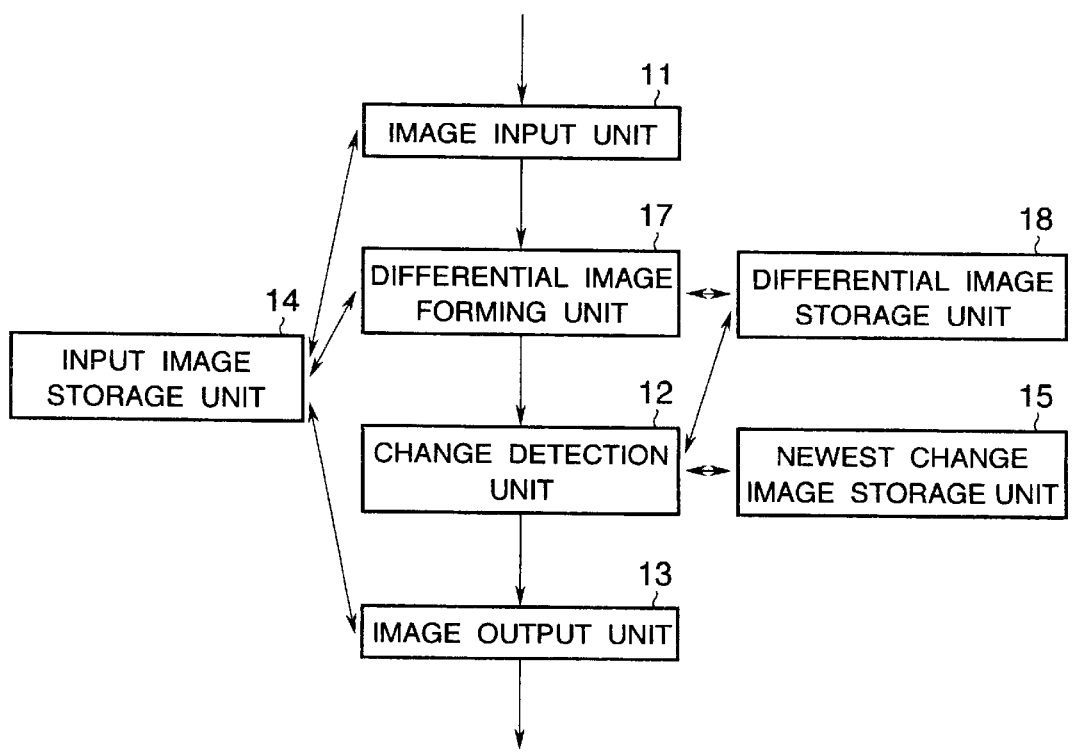
FIG. 14 is a block diagram showing an example of the arrangement of a motion image processing apparatus for performing the processing in FIG. 13.

FIG. 14 is a block diagram showing an example of a motion image processing apparatus for performing the processing in FIG. 13. Note that the arrangement shown in FIG. 14 can be realized by the hardware shown in FIG. 3, as in the first to fourth embodiments.

More specifically, a differential image forming unit 17 in FIG. 14 can be constituted by the CPU 21 which operates in accordance with programs stored in the ROM 22 or the RAM 23 in FIG. 3, and the RAM 23 used as a work memory or the disk unit 24. The differential image forming unit 17 performs differential processing for an input image stored in an input image storage unit 14, and stores the resultant differential image in a differential image storage unit 18. For example, the differential image storage unit 18 can be constituted by the RAM 23 or the disk unit 24 in FIG. 3.

The remaining means in FIG. 14 are the same as those in the first to fourth embodiments. However, a change detection unit 12 performs the same processing as that in the first to fourth embodiments with respect to a differential image stored in the differential image storage unit 18 instead of an input image stored in the input image storage unit 14. A newest change image storage unit 15 does not store an input image stored in the input image storage unit 14 as a newest change image but stores a differential image stored in the differential image storage unit 18.

Figure 15:
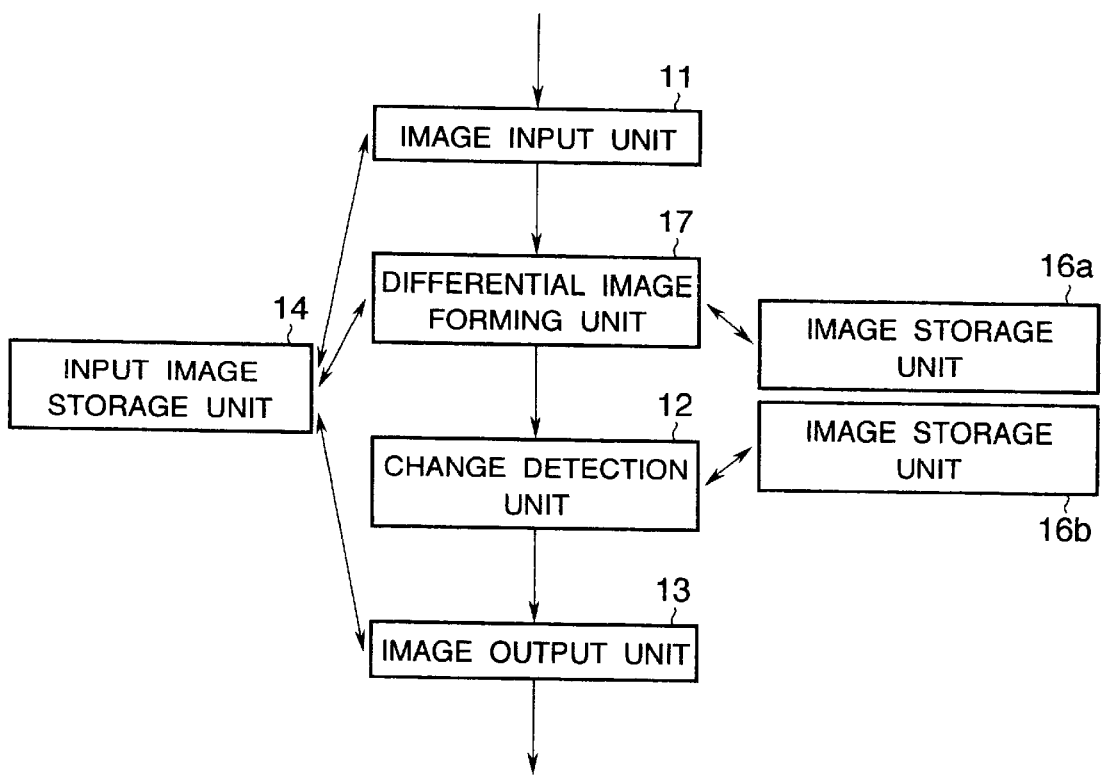
FIG. 15 is a block diagram showing another example of the arrangement of the motion image processing apparatus for performing the processing in FIG. 13.

The arrangement shown in FIG. 14 may be replaced with the arrangement shown in FIG. 15, as in the first to fourth embodiments. More specifically, the operation mode of the differential image storage unit 18 and the newest change image storage unit 15 in FIG. 14 can be changed such that two image storage units 16a and 16b are selectively used upon a switching operation, as shown in FIG. 15. With this arrangement, the processing of copying a differential image from the differential image storage unit 18 to the newest change image storage unit 15, which is performed in the case shown in FIG. 14, can be omitted.

Figure 17:
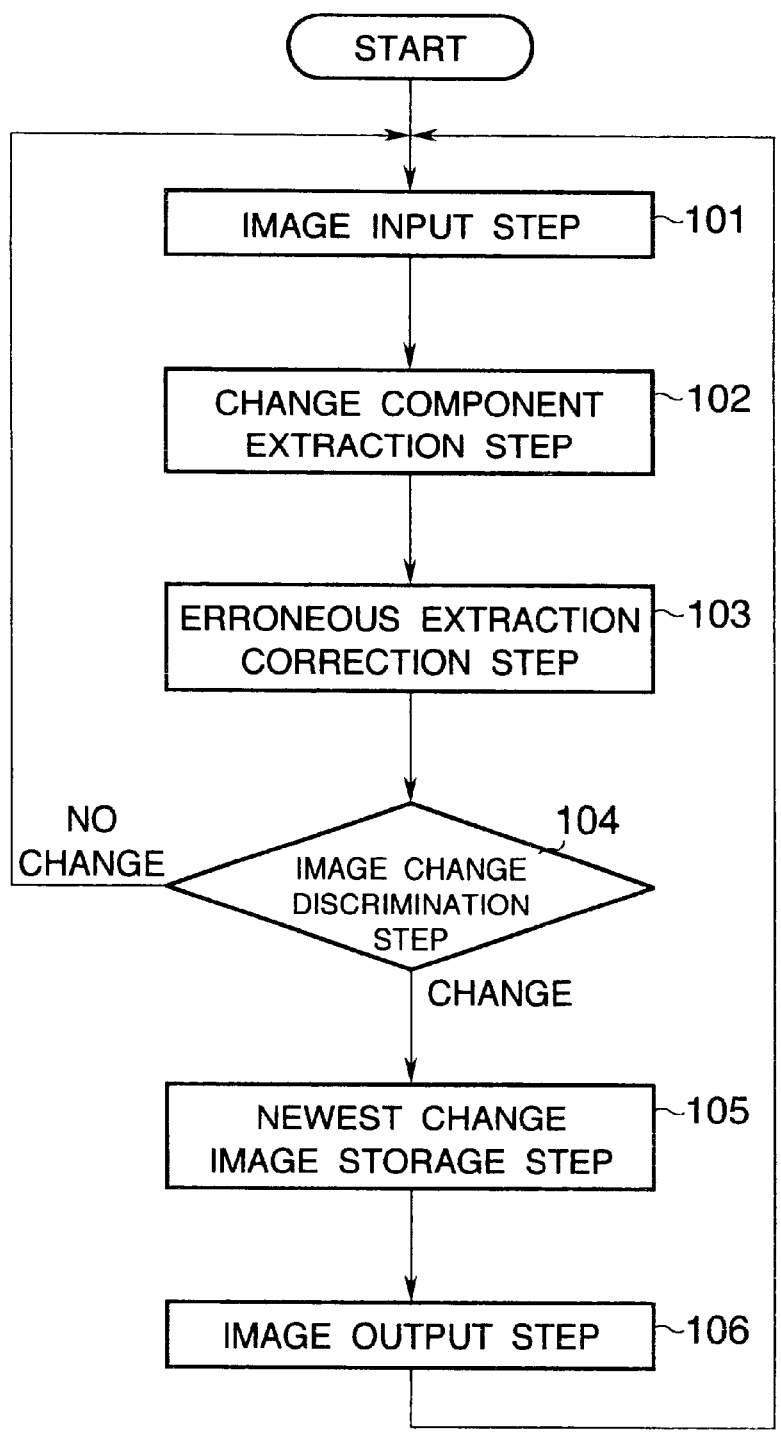
FIG. 17 is a flow chart showing the contents of an image processing method according to the sixth to eighth embodiments of the present invention.

FIG. 17 is a flow chart showing the contents of a motion image processing method according to the sixth embodiment of the present invention.

Referring to FIG. 17, in image input step 101, a still image is extracted from an image obtained by performing a photographing operation with a video camera or the like (not shown), a digital motion image stored in a disk unit or the like (not shown), or the like, and the extracted image is input (this input still image will be referred to as an input image hereinafter).

In change component extraction step 102, the input image input in image input step 1 and an image obtained upon detection of the newest change of several image changes in the past are compared with each other to detect and extract current image change components.

Image change components are extracted by using a newest change image for the following reason. Consider the above two conventional methods of detecting a change area on the basis of a difference between two images. In the method of detecting a change area on the basis of a difference between a background image photographed in advance and a current photographed image, for example, a background image having no moving object must be prepared.

In the method of detecting a change area on the basis of a difference between two frames adjacent to each other along the time axis, if an image change is moderate, the difference becomes small. It is therefore difficult to detect a change area.

In contrast to this, in the method of extracting change components by comparing an input image with a newest change image as in this embodiment, a changeless image such as a background image need not be prepared as a reference image to be compared with the input image, and even a small change in a moderate image change can be reliably detected and extracted.

In erroneous extraction correction step 103, a component, of the change components extracted in change component extraction step 102, which is considered as a component which has been erroneously extracted because of, e.g., flickering of a light source or mixing of noise in a photoelectric scanning unit, an electronic circuit unit, or the like is detected and corrected.

In image change discrimination step 104, it is discriminated, on the basis of the change component corrected in erroneous extraction correction step 103, whether an image change has occurred. If YES in step 104, the flow advances to newest change image storage step 105. If NO in step 104, the flow returns to image input step 101.

In newest change image storage step 105, the input image from which the change components have been extracted in change component extraction step 102 is stored as a newest change image. In image output step 106, the input image for which "CHANGE" is discriminated in image change discrimination step 104 is output to a communication path (e.g., a WAN or LAN) (not shown) to be transmitted, output to an image storage unit (not shown) to be stored, or output to an image display device to be displayed.

Upon completion of the processing in image output step 106, the flow returns to image input step 101 to repeatedly execute the above processing, unless a processing end command is issued.

In the above processing, an image change can be detected with simple processing, i.e., differential processing. An image change can therefore be detected at a sufficiently high speed without any dedicated device for processing an image of a large data amount. In addition, since an image change is discriminated upon removal of an erroneously extracted component of an image change, an image change can be accurately detected.

By outputting an image only when an image change is detected, the corresponding image can be output after its data amount is reduced. For example, by outputting only an image for which an image change is detected to a communication path, a storage unit, or a display device, the transmission, storage, or display data amount can be reduced.

Figure 18:
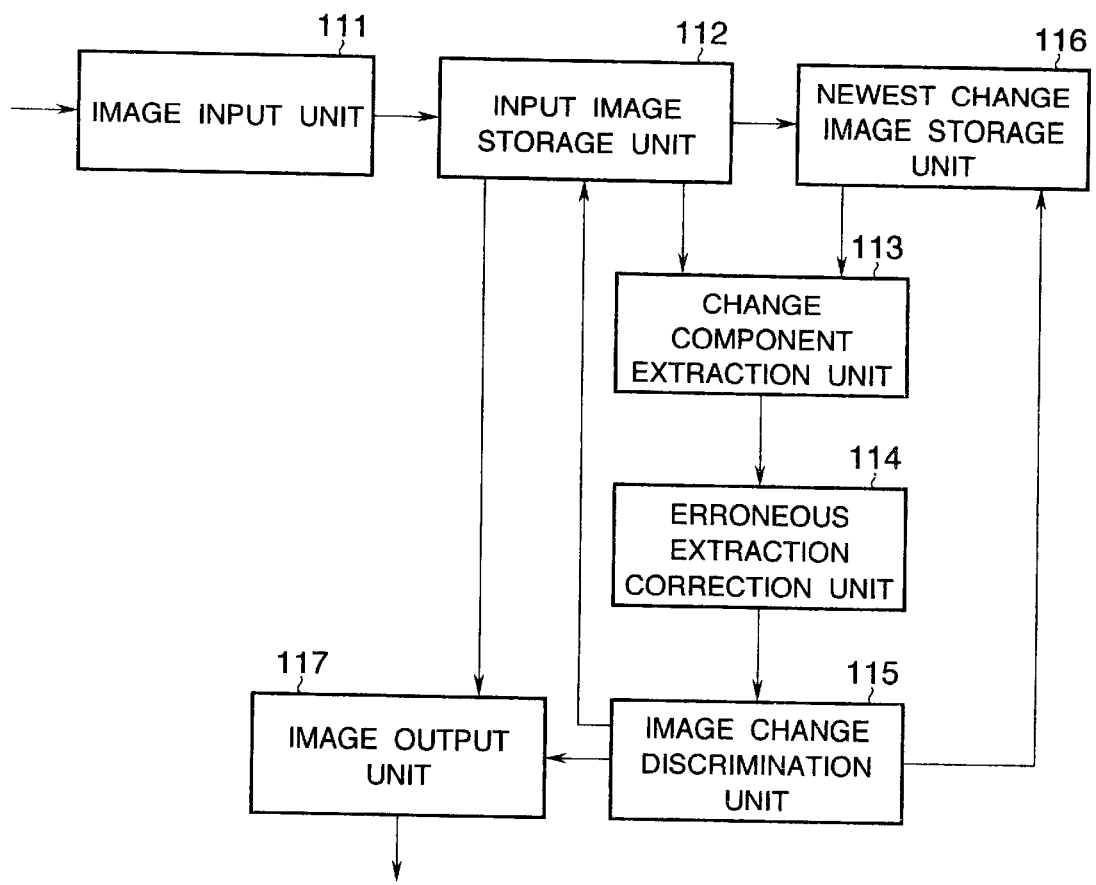
FIG. 18 is a block diagram showing an example of the arrangement of a motion image processing apparatus for performing the processing in FIG. 17.

FIG. 18 is a block diagram showing an example of the arrangement of a motion image processing apparatus for performing the processing in FIG. 17.

Note that a hardware arrangement for realizing the functions shown in FIG. 18 is the same as that shown in FIG. 3.

Referring to FIG. 18, an image input unit 111 acquires a still image from an image obtained by a video camera, a digital motion image stored in a disk unit, or the like, and stores it in an input image storage unit 112.

Referring to FIG. 3, for example, the image input unit 111 may be constituted by a known image input unit which causes the video capture device 27 to acquire a still image (input image) from an image, obtained by performing a photographing operation with the video camera 26, and stores the still image in the RAM 23 under the control of the CPU 21 which operates in accordance with programs stored in the ROM 22 or the RAM 23.

Alternatively, the image input unit 111 may be constituted by a known image input unit which reads, via the disk I/O 25, a still image (input image) from a digital motion image stored in the disk I/O 25, and stores the read image in the RAM 23 under the control of the CPU 21 which operates in accordance with programs stored in the ROM 22 or the RAM 23.

Although not shown in FIG. 3, the image input unit 111 may be constituted by a known image input unit which causes a digital still camera to photograph a still image, and stores the image in the RAM 23 under the control of the CPU 21 which operates in accordance with programs stored in the ROM 22 or the RAM 23. As is apparent, the image input unit 111 may be constituted by a combination of the above plurality of image input unit.

A change component extraction unit 113 compares an input image stored in the input image storage unit 112 with a newest change image stored in a newest change image storage unit 116 to extract current image change components. An erroneous extraction correction unit 114 detects and corrects a component, of the change components extracted by the change component extraction unit 113, which is considered as a component which has been erroneously extracted because of, e.g., flickering of a light source or mixing of noise in a photoelectric scanning unit, an electronic circuit unit, or the like.

An image change discrimination unit 115 receives the image change components which has been corrected by the input image storage unit 14, and discriminates whether an image change has occurred. If the unit 115 discriminates that an image change has occurred, a newest change image storage unit 116 reads out the corresponding input image stored in the input image storage unit 112, and stores it as a newest change image.

Each of the change component extraction unit 113, the erroneous extraction correction unit 114, and the image change discrimination unit 115 can be constituted by the CPU 21 which operates in accordance with programs stored in the ROM 22 or the RAM 23 in FIG. 3, and the RAM 23 used as a work memory or the disk unit 24. As is apparent, each unit may be constituted by a dedicated CPU and a dedicated RAM or disk unit, or dedicated hardware.

If "CHANGE" is detected by the image change discrimination unit 115, an image output unit 117 outputs the input image stored in the input image storage unit 112 to a communication path (e.g., a WAN or LAN) to transmit it, output to an image storage unit to store it, or output to an image display device to display it.

For example, referring to FIG. 3, the image output unit 117 can be constituted by a known image output unit which transmits an image to a communication path such as a WAN or LAN via the communication device 28 under the control of the CPU 21 which operates in accordance with programs stored in the ROM 22 or the RAM 23.

Alternatively, the image output unit 117 my be constituted by a known image output unit which stores part of a digital motion image in the disk unit 24 under the control of the CPU 21 which operates in accordance with programs stored in the ROM 22 or the RAM 23. In this case, the disk unit 24 may be a unit which can be used via a network such as a LAN.

Although not shown in FIG. 3, the image output unit 117 may be constituted by a known image output unit which continuously displays still images on the same portion on a display to display a motion image. As is apparent, the image output unit 117 may be constituted by a combination of the above plurality of image output units, and may be used by properly selecting the control programs for these units.

For example, referring to FIG. 3, the input image storage unit 112 and the newest change image storage unit 116 may be constituted by the RAM 23 or the disk unit 24. As is apparent, each of the storage units 112 and 116 may be constituted by a dedicated storage device.

Figure 19:
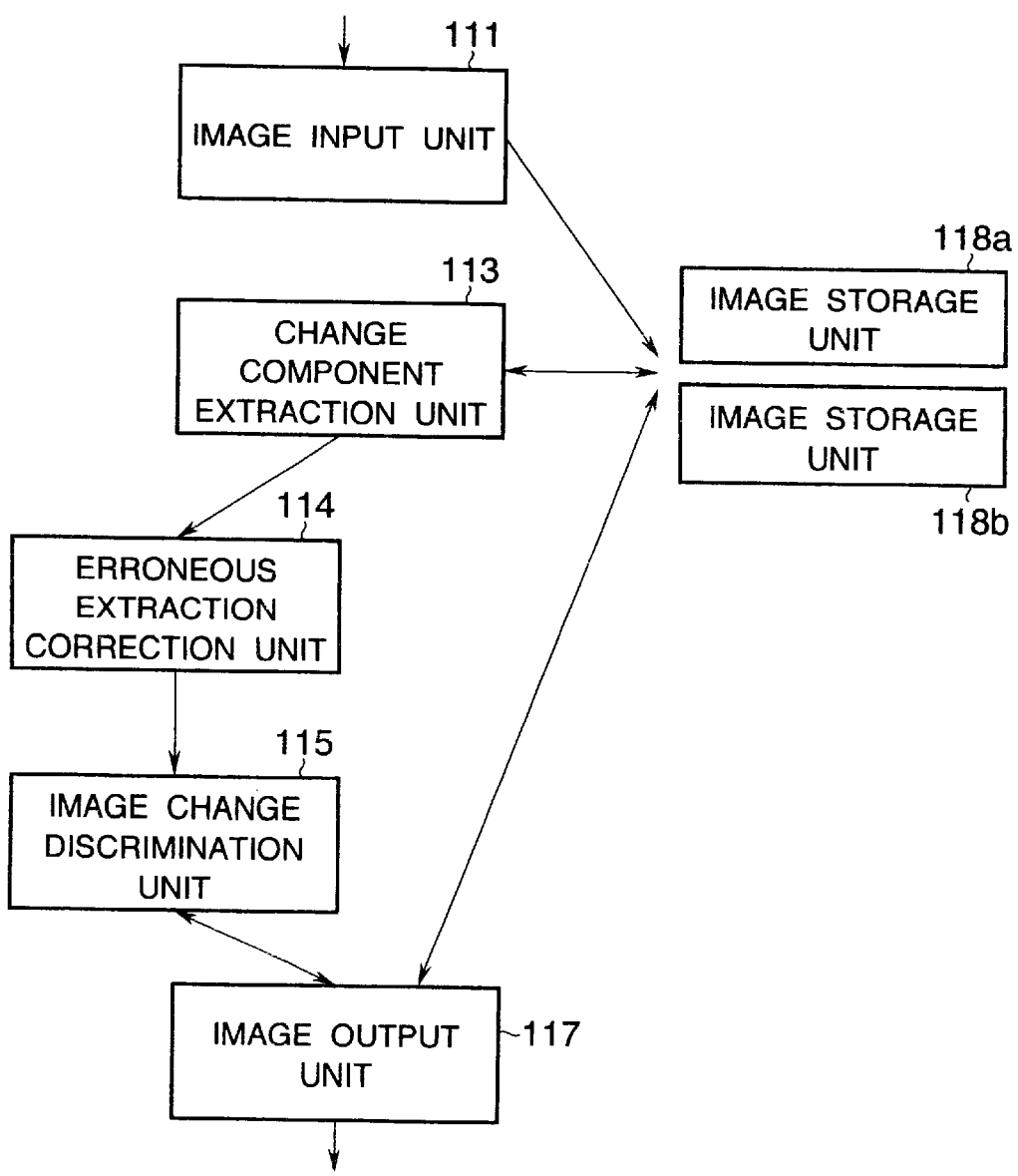
FIG. 19 is a block diagram showing another example of the arrangement of a motion image processing apparatus for performing the processing in FIG. 17.

Note that the input image storage unit 112 and the newest change image storage unit 116 may be constituted by two image storage units 118a and 118b which are selectively used upon a switching operation, as shown in FIG. 19. In this arrangement, every time an image change component is detected by the change component extraction unit 113, the roles of the image storage units 118a and 118b are switched in newest change image storage step 106 in FIG. 17.

Assume that an image change is detected at a certain time point in the process of sequentially storing an input image in the image storage unit 118a. In this case, the image storage unit 118a is switched to serve as a storage unit for storing a newest change image, whereas the image storage unit 118b is switched to serve as a storage unit for storing an input image.

With this operation, the input image stored in the image storage unit 118a when the image change is detected is used as a newest change image afterward, and the processing of copying an input image from the input image storage unit 112 to the newest change image storage unit 116 in the case shown in FIG. 18 can be omitted.

Note that the image storage units 118a and 118b need not be used as separate memories, but the above function can be realized by one memory with a bank switching operation.

The processing contents in each step in FIG. 17 will be described in detail with reference to the arrangements of FIGS. 18 and 3.

In image input step 101, the image input unit 111 acquires a still image from an image obtained by the video camera 26 or a digital motion image stored in the disk unit 24. Alternatively, the image input unit 111 photographs a still image using a digital still camera (not shown), and stores the still image in the input image storage unit 112.

In change component extraction step 102, the input image stored in the input image storage unit 112 in the above manner is compared with the newest change image stored in the newest change image storage unit 116 to detect and extract current image change components.

The processing in change component extraction step 102 is performed by calculating the pixel value difference (absolute value) between each pair of corresponding pixels (pixels at identical positions in the respective images) using the input image and the newest change image, and by extracting a pixel value difference exceeding a given threshold value as an image change component. The following description will be made on the assumption that each pixel value difference is calculated by processing the respective pixels of an image in the raster scan order, as indicated by the arrow in FIG. 20. As is apparent, however, pixels may be processed concurrently.

In erroneous extraction correction step 103, a component, of the change components extracted by the change component extraction unit 113 in change component extraction step 102, which is considered as a component which has been erroneously extracted because of, e.g., flickering of a light source or mixing of noise in a photoelectric scanning unit, an electronic circuit unit, or the like is detected and corrected, thereby generating corrected image change components. In addition, the sum total of corrected image change components is obtained.

In this erroneous extraction correction processing, first of all, it is checked whether a change component extracted in change component extraction step 102 satisfies the following two conditions:

(1) a condition in which the pixel value difference (absolute value) (corresponding to a subject pixel) between a given pair of corresponding pixels (pixels at identical positions in the respective images) of an input image and a newest change image is larger than a given value (threshold value 1), and all the pixel value differences (absolute values) (corresponding to eight pixels adjacent to the subject pixel (i.e., the currently processed pixel)) between pairs of corresponding pixels of the input image and the newest change image are equal to or smaller than the given value (threshold value 1); and (2) a condition in which a pixel value difference (absolute value) (corresponding to a subject pixel) between a given pair of corresponding pixels of the input image and the newest change image is equal to or smaller than the given value (threshold value 1), and all the pixel value differences (absolute values) (corresponding to eight pixels adjacent to the subject pixel between pairs of corresponding pixels of the input image and the newest change image is larger than the given value (threshold value 1).

If condition (1) is satisfied, it is determined that an image change component is erroneously extracted. This value is not added to a total change amount (in this embodiment, the sum total of pixel value differences during processing (corrected image change components) will be referred to as a total change amount. A total change amount is calculated by processing the respective pixels in the raster scan order, as indicated by the arrow in FIG. 20, in the same manner as the above calculation of pixel value differences).

If condition (2) is satisfied, the pixel value difference (absolute value) between the corresponding pixels is changed to the mean value of pixel value differences (absolute values) at the positions of the surrounding eight pixels, and the mean value is added to the total change amount. If neither condition (1) nor condition (2) is satisfied, the pixel value difference (absolute value) between the corresponding pixels itself is added to the total change amount.

That is, corrected image change components are defined such that the pixel value difference (absolute value) between pixels corresponding to condition (1), of two conditions (1) and (2), is set to be 0, the pixel value difference (absolute value) between pixels corresponding to condition (2) is set to be the mean value of pixel value differences (absolute values) at the positions of eight pixels around a subject pixel, and a pixel value difference between pixels corresponding to neither condition (1) nor condition (2) is a pixel value difference (absolute value) extracted in change component extraction step 102.

In image change discrimination step 104, an image change is discriminated on the basis of the sum total (total change amount) of image change components corrected by the erroneous extraction correction unit 114 in erroneous extraction correction step 103. More specifically, the above total change amount is compared with a predetermined value (threshold value 2). If the total change amount is larger than threshold value 2, it is discriminated that "THERE IS CHANGE". If the total change amount is not larger than threshold value 2 after all the pixels in the frame are processed, it is discriminated that "THERE IS NO CHANGE" in the frame.

Figure 21:
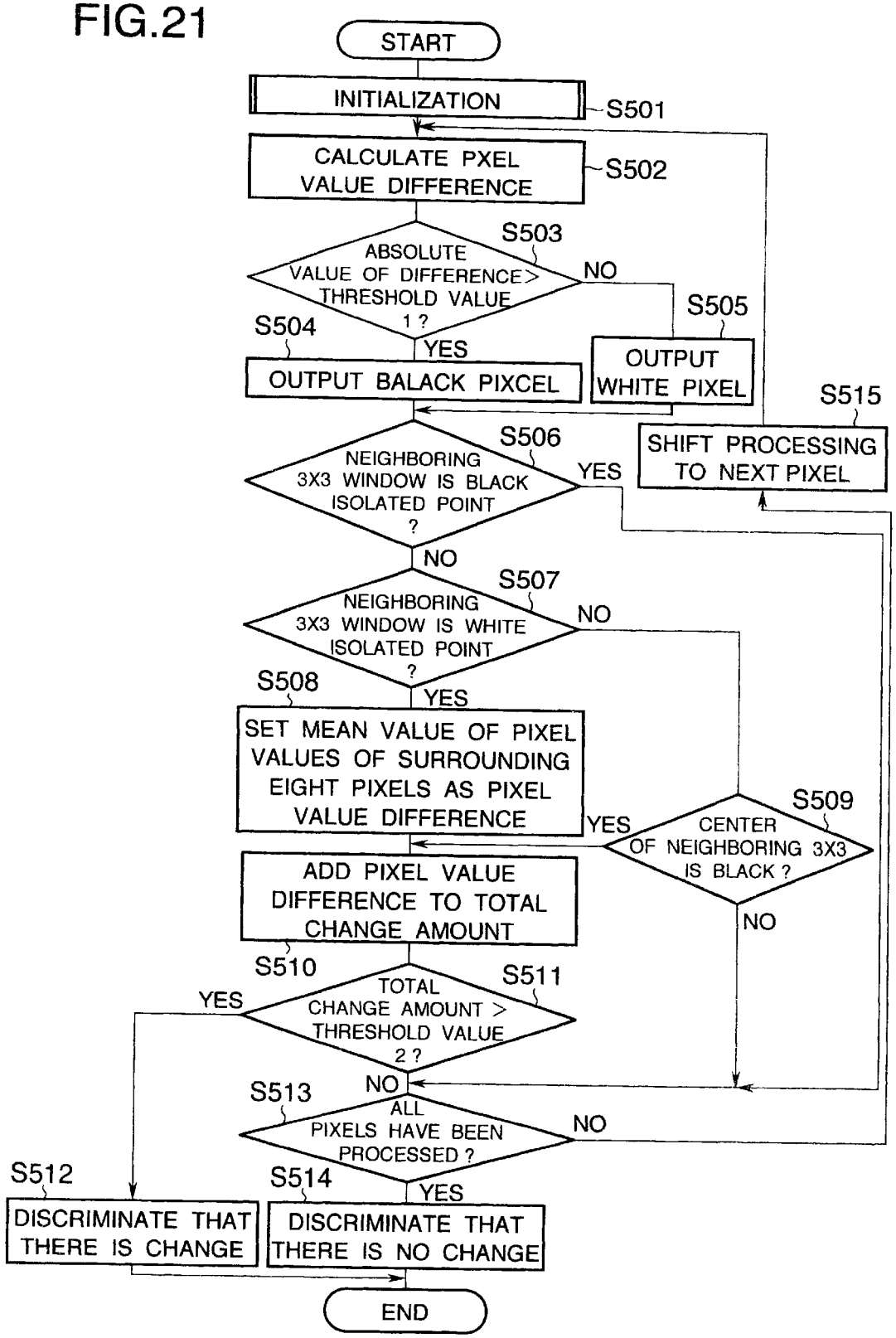
FIG. 21 is a flow chart showing the detailed processing in the change component extraction step, the erroneous extraction correction step, and the image change discrimination step in the sixth embodiment.

The flow chart of FIG. 21 shows an example of the contents of processing executed by the CPU 21 in change component extraction step 102, erroneous extraction correction step 103, and image change discrimination step 104 in FIG. 17 in accordance with programs stored in the ROM 22 or the RAM 23 in FIG. 3.

In the processing shown in FIG. 21, the pixel value difference (absolute value) between each pair of corresponding pixels of an input image and a newest change image is calculated. Of the calculated pixel value differences, only pixel value differences each having a value exceeding a given value (threshold value 1) are added throughout the image. If the total value (total change amount) exceeds another given value (threshold value 2), it is discriminated that the input image has changed as compared with the newest change image, i.e., "THERE IS CHANGE". If the total change amount of the entire image is equal to or smaller than threshold value 2, it is discriminated that "THERE IS NO CHANGE".

Assume that the pixel value difference (absolute value) between a given pair of corresponding pixels exceeds threshold value 1, but all pixel value differences corresponding to eight pixels adjacent to the subject pixel having the above pixel value difference are equal to or smaller than threshold value 1. In this case, it is determined that the pixel value difference at the subject pixel position is an erroneously extracted component, i.e., a change component is erroneously extracted. Therefore, this value is not added to the total change amount.

Assume that the pixel value difference (absolute value) between a given pair of corresponding pixels is equal to or smaller than a given value (threshold value 1), but all pixel value differences corresponding to eight pixels adjacent to the subject pixel having the above pixel value difference are larger than threshold value 1. In this case, it is determined that extraction of an image change component has been omitted, and the pixel value difference at the subject pixel position is changed to the mean value of the respective pixel value differences (absolute values) at the surrounding eight pixel positions. This mean value is then added to the total change amount.

The processing in this embodiment will be described with reference to the flow chart of FIG. 21.

Figure 20:
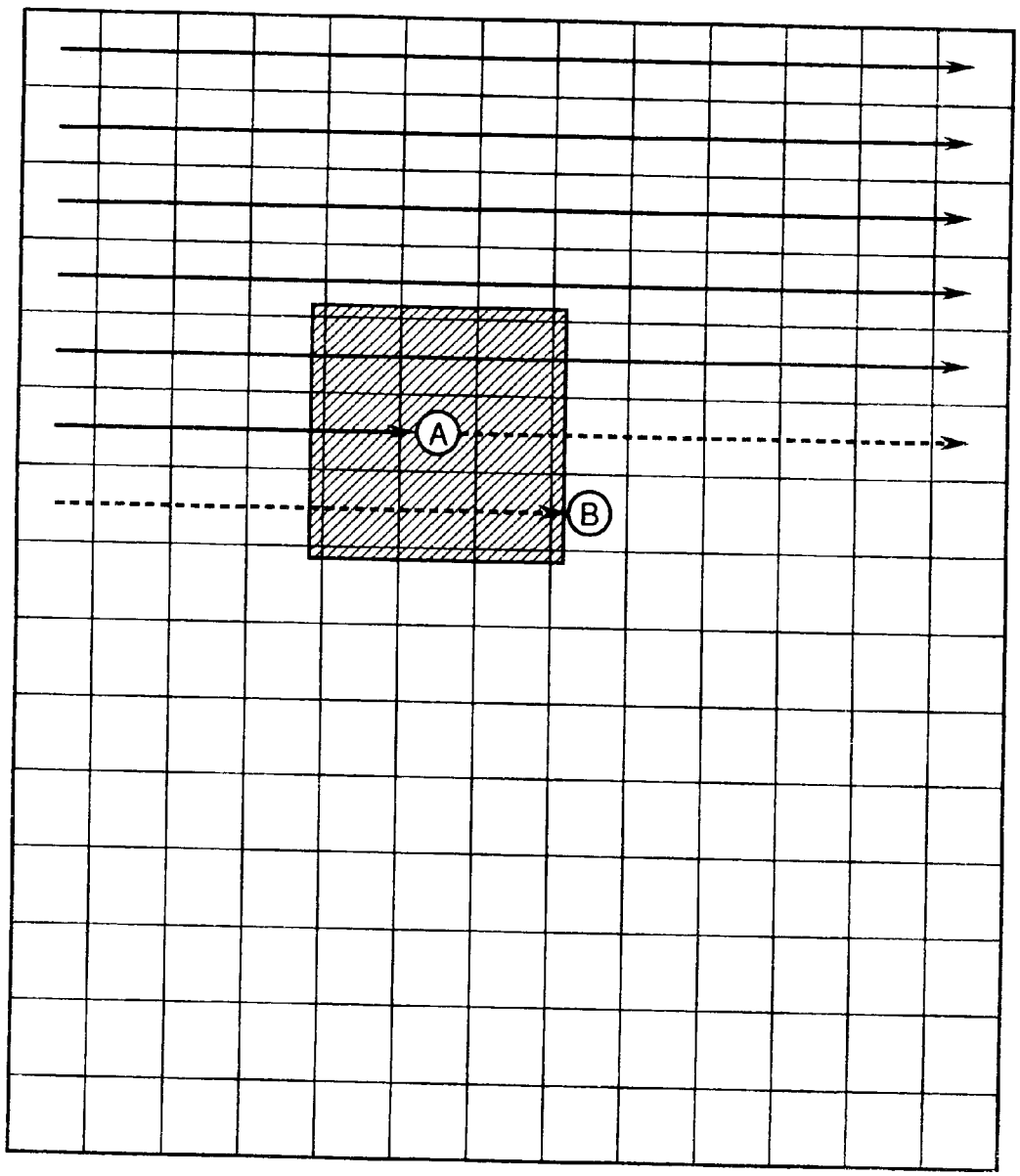
FIG. 20 is a view for explaining a pixel processing order in detecting an image change in the sixth to ninth embodiments.

Referring to FIG. 21, in step S501, initialization processing required for erroneous extraction correction processing using a nine-pixel area (3 pixels (vertical)×3 pixels (horizontal)) is performed. As described above, in order to determine erroneous extraction of an image change component, pixel value differences corresponding to eight pixels around a subject pixel position for determination of erroneous extraction must be obtained in advance. FIG. 20 shows this state.

Assume that a position A is a subject position for determination of erroneous extraction in FIG. 20. In this case, a nine-pixel area (3 pixels (vertical)×3 pixels (horizontal)) indicated by the hatched portion includes pixel positions (to be referred to as a noise discrimination subject area hereinafter) as reference positions for discrimination of erroneous extraction concerning the subject position A. Referring to FIG. 20, processing is performed in the raster scan order. For this reason, in discriminating erroneous extraction concerning the subject position A, a pixel value difference (absolute value) at a pixel position B required for subsequent discrimination is calculated in advance.

The initialization processing in step S501 will be described in detail with reference to the flow chart of FIG. 22.

Figure 22:
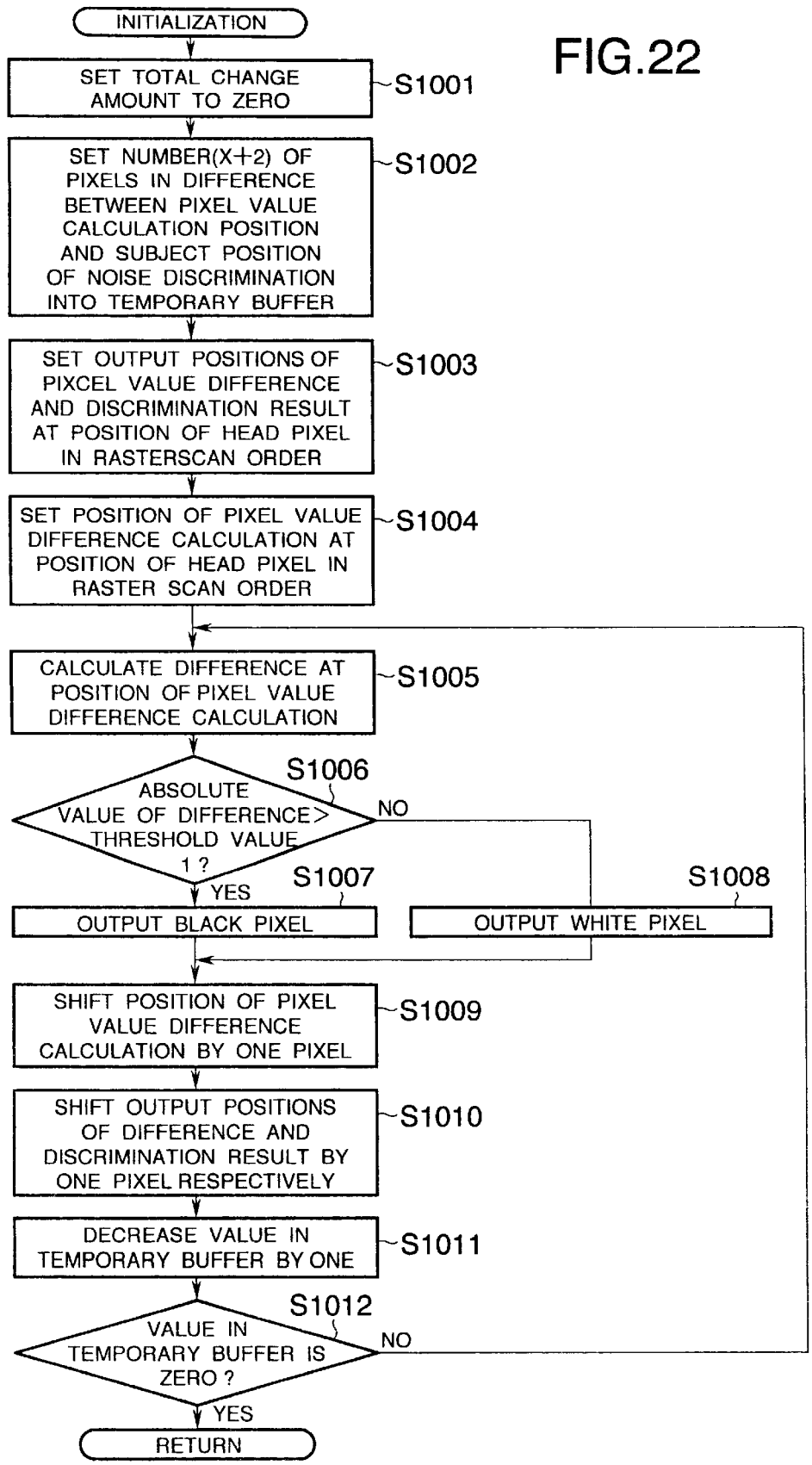
FIG. 22 is a flow chart showing the detailed initialization processing in step S501 in FIG. 21.

Referring to FIG. 22, in step S1001, a total change amount is set to zero. In step S1002, the difference in the number of pixels ((x+2) where x is the number of pixels in the main scanning direction) between the pixel value calculation position (position B in FIG. 20) and the subject position of noise discrimination (position A in FIG. 20) is set in a first temporary buffer (not shown).

In step S1003, the memory address of an output destination to which a pixel value difference calculation result is to be output and the memory address of an output destination to which a discrimination result indicating whether the calculated pixel value difference is larger than predetermined threshold value 1 is to be output are respectively set in second and third temporary buffers (not shown). In this case, the output destinations of the pixel value difference and the comparison result indicating whether the pixel value difference is larger than threshold value 1 are independently ensured in free areas in the RAM 23.

In step S1004, a pixel position where a pixel value difference is to be calculated is set as the head pixel position (the head position of a frame) in the raster scan order in a fourth temporary buffer (not shown). In step S1005, a pixel value difference at the pixel position set in the fourth temporary buffer is calculated. This calculated pixel value difference is output to the pixel value difference output destination (a free area in the RAM 23) held in the second temporary buffer.

In this case, if the input image is a halftone image, the pixel value difference is, for example, the absolute value of the difference between subject pixels. If the input image is a color image, the pixel value difference is, for example, the sum of the absolute values of the differences between R, G, and B values of subject pixels.

In step S1006, it is checked whether the pixel value difference calculated in step S1005 is larger than predetermined threshold value 1. If YES in step S1006, the flow advances to step S1007. If NO in step S1006, the flow advances to step S1008.

In step S1007, as a signal indicating that the pixel value difference at the subject pixel position is larger than predetermined threshold value 1, "1" (also called a black pixel) is output to a bit map data holding area (the output destination of the discrimination result indicating that the pixel value difference is larger than threshold value 1) corresponding to the subject pixel position set in the third temporary buffer. The flow then advances to step S1009.

In step S1008, as a signal indicating that the pixel value difference at the subject pixel position is equal to or smaller than predetermined threshold value 1, "0" (also called a white pixel) is output to a bit map data holding area corresponding to the subject pixel position. The flow then advances to step S1009.

In the RAM 23, the above bit map data holding area is a bit map image data area having the same size as that of an image for which change detection is being performed. At each pixel position of the image for which change detection is being performed, binary image data (black or white pixel data) consisting of a corresponding pixel is to be held.

In step S1009, the pixel position set in the fourth temporary buffer is updated to shift the pixel position, at which a pixel value difference is to be calculated, by one pixel ahead. In step S1010, the contents set in the second temporary buffer are updated to shift the output destination of the pixel value difference calculation result by one pixel ahead. In addition, the contents set in the third temporary buffer are updated to shift, by one pixel ahead, the output destination to which the discrimination result indicating that the calculated pixel value difference is larger or smaller than predetermined threshold value 1 is to be output.

In step S1011, the value (the difference in the number of pixels between the pixel value difference calculation position and the subject position of noise discrimination) set in the first temporary buffer is decreased by one. In step S1012, it is checked whether the value set in the first temporary buffer is zero. With this operation, it is checked whether all the pixels required for initialization have been processed.

If it is discriminated that the value in the first temporary buffer is zero, it is determined that all the pixels required for initialization have been processed. The processing in step S101 in FIG. 6 is then terminated, and the flow returns to the initial processing routine. If the value in the first temporary buffer is not zero, the flow returns to step S1005 to further perform initialization processing.

In step S502 in FIG. 21, a pixel value difference at the pixel position (subject position of noise discrimination) set in the fourth temporary buffer is calculated. The calculated pixel value difference is output to the pixel value difference output destination held in the second temporary buffer. In step S503, it is checked whether the pixel value difference calculated in step S502 is larger than predetermined threshold value 1. If YES in step S503, the flow advances to step S504. If NO in step S503, the flow advances to step S505.

In step S504, as a signal indicating that the pixel value difference at the pixel value difference calculation position in step S502 is larger than predetermined threshold value 1, data of "1" (black pixel) is output to a bit map data holding area corresponding to the subject pixel position set in the third temporary buffer. The flow then advances to step S506.

In step S505, as a signal indicating that the pixel value difference at the pixel value difference calculation position in step S502 is equal to or smaller than predetermined threshold value 1, data of "0" (white pixel) is output to a bit map data holding area corresponding to the subject pixel position. The flow then advances to step S506.

In step S506, whether the pixel value difference (absolute value) at a subject position of noise discrimination (e.g., the position A in FIG. 20) satisfies condition (1) described above is discriminated. More specifically, whether the pixel value difference at the subject position A exceeds threshold value 1, and the pixel value difference at each of eight pixel positions adjacent to the pixel position A is equal to or smaller than threshold value 1 is discriminated in the following manner.

The binary image data stored in the bit map data holding area corresponding to the nine-pixel area (3 pixels (vertical)×3 pixels (horizontal)) (the noise discrimination subject area indicated by hatching in FIG. 20) around the subject position A of noise discrimination are referred to check whether the central pixel of the noise discrimination subject area is a black isolated point (only the central pixel is a black pixel, but all the surrounding eight pixels are white pixels). With this operation, the above discrimination processing is performed. If it is discriminated that the central pixel is a black isolated point, the flow advances to step S513. Otherwise, the flow advances to step S507.

In step S507, whether the pixel value difference (absolute value) at a subject position of noise discrimination (e.g., the position A in FIG. 20) satisfies condition (2) described above is discriminated. More specifically, whether the pixel value difference at the subject position A is equal to or smaller than threshold value 1, and the pixel value difference at each of eight pixel positions adjacent to the pixel position A is larger than threshold value 1 is discriminated in the following manner.

The binary image data stored in the bit map data holding area corresponding to the nine-pixel area (3 pixels (vertical)×3 pixels (horizontal)) (the noise discrimination subject area indicated by hatching in FIG. 20) centered on the subject position A of noise discrimination are referred to check whether the central pixel of the noise discrimination subject area is a white isolated point (only the central pixel is a white pixel, but all the surrounding eight pixels are black pixels). With this operation, the above discrimination processing is performed. If it is discriminated that the central pixel is a white isolated point, the flow advances to step S508. Otherwise, the flow advances to step S509.

In step S508, the mean value of the pixel value differences (absolute values) at the eight pixel positions around the subject position A in the nine-pixel area (3 pixels (vertical)×3 pixels (horizontal)) (the noise discrimination subject area indicated by hatching in FIG. 20) centered on the subject position A of noise discrimination is calculated by referring to the area of the RAM 23 in which the pixel value difference calculation result is held. The obtained mean value is then set as the pixel value difference at the subject position A of noise discrimination.

In step S509, whether the pixel value difference (absolute value) at the subject position A of noise discrimination is larger than threshold value 1 is discriminated by referring to the binary image data stored in the bit map data holding area corresponding to the subject position A of noise discrimination and checking whether the pixel at the subject position A of noise discrimination is a black pixel. If a black pixel is discriminated in step S509, the flow advances to step S510. Otherwise, the flow advances to step S513.

In step S510, the pixel value difference (the above mean value after the processing in step S508; the value calculated in step S502 after the processing in step S509) is added to the total change amount to obtain a new total change amount. In step S511, it is checked whether the total change amount updated in step S510 is larger than predetermined threshold value 2. If YES in step S511, the flow advances to step S512. If NO in step S511, the flow advances to step S513.

In step S512, it is discriminated that an image change has occurred, and the processing in the flow chart of FIG. 21 is terminated. In step S513, it is checked whether all pixels have been processed. If YES in step S513, the flow advances to step S514 to discriminate that no image change has occurred, and the processing in the flow chart of FIG. 21 is terminated. If NO in step S513, the flow advances to step S515.

In step S515, processing is shifted to the next pixel. That is, both the pixel value difference calculation position and the subject position of noise discrimination are shifted to the next pixels to set a new subject pixel for noise discrimination. The flow then returns to step S502.

In the above processing, a nine-pixel area (3 pixels (vertical)×3 pixels (horizontal)) centered on a subject position of noised discrimination may include a portion where no corresponding binary image data or no pixel value difference exists, as in a case wherein the above subject position is at an end portion (upper, lower, left, or right end) of the image. In this case, such a portion is handled as white pixel data or "0".

If it is discriminated in image change discrimination step 104 that an image change has occurred, the input image input in image input step 101 and stored in the input image storage unit 112 is stored as a newest change image in the newest change image storage unit 116 in newest change image storage step 105.

If it is discriminated in image change discrimination step 104 that an image change has occurred, the input image stored in the input image storage unit 112 is output to a communication path (a WAN or LAN) via the communication device 28 or the like to be transmitted, output to the disk unit 24 to be stored, or output to an image display device (not shown) to be displayed in image output step 106.

As described above, according to the sixth embodiment, fine change components dispersing randomly are extracted and removed, as erroneously extracted image change components, from change components extracted by comparison between a subject image whose motion is to be detected and a newest change image. On the basis of the change components corrected in this manner, it can be determined whether the above image has undergone a change. Therefore, an image change can be detected without being affected by, e.g., change components produced randomly in the image because of flickering of a light source or mixing of noise in a photoelectric scanning unit, an electronic circuit unit, or the like. That is, an image change can be accurately detected.

The seventh embodiment of the present invention will be described next.

The seventh embodiment is another embodiment of the processing in change component extraction step 102, erroneous extraction correction step 103, and image change discrimination step 104 in the sixth embodiment.

Figure 23:
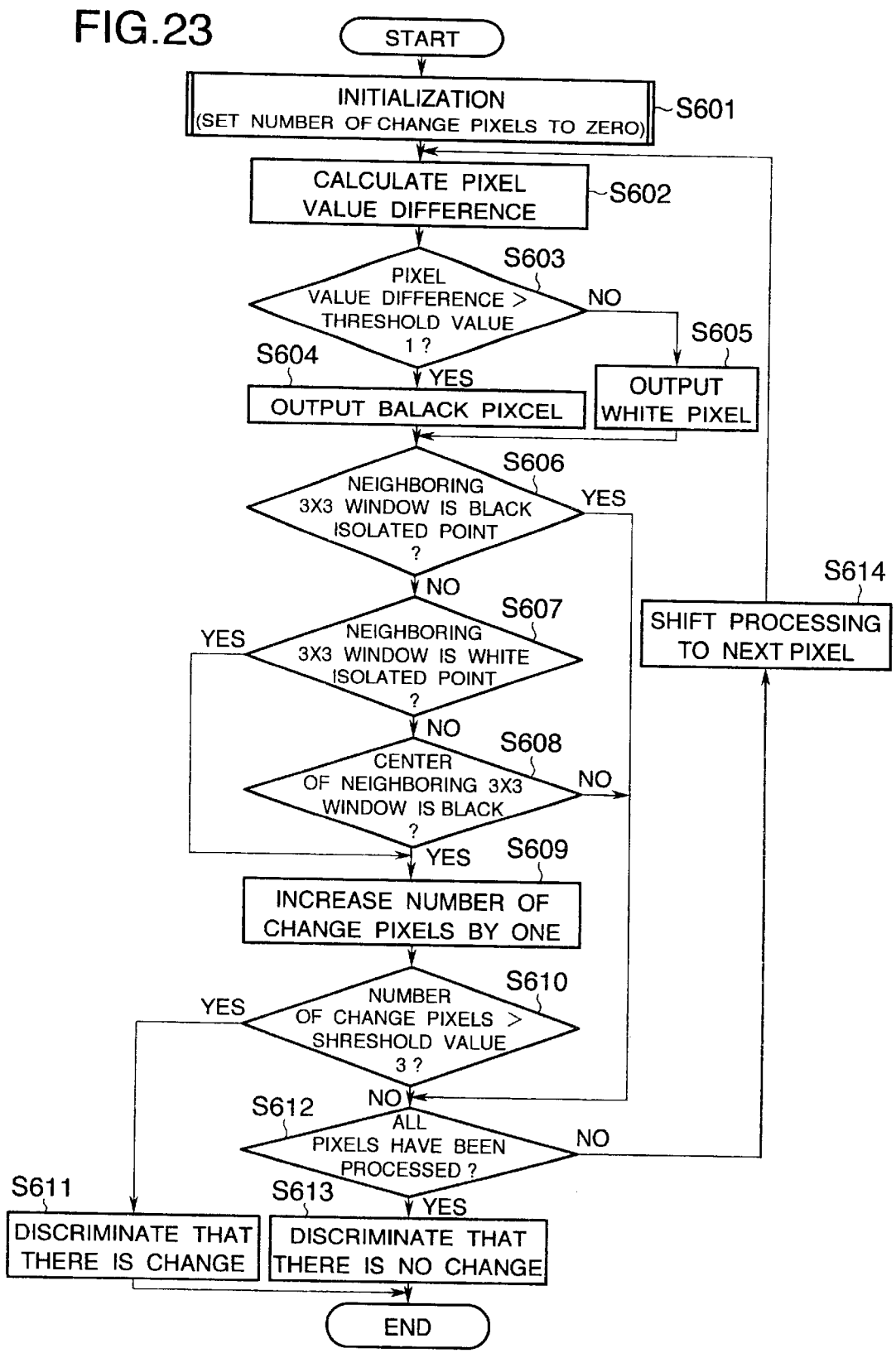
FIG. 23 is a flow chart showing the detailed processing in the change component extraction step, the erroneous extraction correction step, and the image change discrimination step in the seventh embodiment.

FIG. 23 is a flow chart showing an example of the contents of processing executed by the CPU 21 in change component extraction step 102, erroneous extraction correction step 103, and image change discrimination step 104 in the seventh embodiment in accordance with programs stored in the ROM 22 or the RAM 23 in FIG. 3.

In the processing shown in FIG. 23, the pixel value difference (absolute value) between each pair of corresponding pixels is calculated using an input image and a newest change image. If each pixel value difference is larger than a given value (threshold value 1), it is determined that the corresponding subject pixel has undergone a change (a pixel having undergone a change will be referred to as a change pixel hereinafter). If the number of change pixels in the entire input image is larger than a given value (threshold value 3), it is determined that the input image has changed as compared with the newest change image. That is, it is determined that an image change has occurred.

Assume that the pixel value difference (absolute value) between a given pair of corresponding pixels is larger than threshold value 1, but all pixel value differences corresponding to eight pixels adjacent to the subject pixel having the above pixel value difference are equal to or smaller than threshold value 1. In this case, it is determined that the pixel value difference at the subject pixel position is an erroneously extracted component, i.e., an erroneously extracted change component. Therefore, this subject pixel is not counted as a change pixel.

Assume that the pixel value difference (absolute value) between a given pair of corresponding pixels is equal to or smaller than threshold value 1, but all pixel value differences corresponding to eight pixels adjacent to the subject pixel having the above pixel value difference are larger than threshold value 1. In this case, it is determined that extraction of an image change component has been omitted, and this subject pixel is counted as a change pixel.

Similar to the sixth embodiment, the above change pixel discrimination processing is performed by processing the respective pixels in an image in the raster scan order, as shown in FIG. 20, and the sum total of change pixels during processing will be referred to as the number of change pixels. As is apparent, pixels may be processed concurrently.

The processing in this embodiment will be described below with reference to the flow chart of FIG. 23.

Referring to FIG. 23, in step S601, initialization processing required for erroneous extraction correction processing using a nine-pixel area (3 pixels (vertical)×3 pixels (horizontal)) is performed as in the processing in step S501 in FIG. 21.

In step S601, processing is performed in the raster scan order, as shown in FIG. 20. For this reason, in discriminating erroneous extraction concerning the subject position A, a pixel value difference (absolute value) at the pixel position B which is required for the subsequent discrimination processing is calculated, and it is discriminated in advance whether each calculated pixel value difference is larger than predetermined threshold value 1.

If it is discriminated that a given pixel value difference is larger than predetermined threshold value 1, a black pixel is assigned. Otherwise, a white pixel is assigned. With this operation, binary image data consisting of pixels corresponding to the respective pixel positions of the image for which change detection is being performed are generated in advance.

The initialization processing in step S601 can be realized by executing the processing in the flow chart of FIG. 22, as in the initialization processing in step S501 in FIG. 21.

In the seventh embodiment, however, the second temporary buffer used in the sixth embodiment and the memory area for holding a pixel value difference itself are not required. For this reason, in the processing in steps S1003, S1005, and S1010 in FIG. 22, processing associated with the second temporary buffer in the sixth embodiment and the memory area for holding a pixel value difference itself is not required.

In the seventh embodiment, "SET TOTAL CHANGE AMOUNT TO ZERO" in step S1001 in FIG. 22 is replaced with "SET NUMBER OF CHANGE PIXELS TO ZERO".

In step S602 in FIG. 23, a pixel value difference at a pixel value difference calculation position (subject position of noise discrimination) is calculated by the same method as in the sixth embodiment. In step S603, it is checked whether the pixel value difference calculated in step S602 is larger than predetermined threshold value 1. If YES in step S603, the flow advances to step S604. If NO in step S603, the flow advances to step S605.

In step S604, as a signal indicating that the pixel value difference at the pixel value difference calculation position in step S602 is larger than predetermined threshold value 1, data of "1" (black pixel) is output to a bit map data holding area corresponding to the subject pixel position set in a third temporary buffer (not shown). The flow then advances to step S606.

In step S605, as a signal indicating that the pixel value difference at the pixel value difference calculation position in step S602 is equal to or smaller than predetermined threshold value 1, data of "0" (white pixel) is output to a bit map data holding area corresponding to the subject pixel position. The flow then advances to step S606.

In step S606, similar to the sixth embodiment, whether the pixel value difference at the subject position of noise discrimination (e.g., the position A in FIG. 20) satisfies condition (1) described above is discriminated by checking whether the subject position A of noise discrimination is a black isolated point in the nine-pixel area (3 pixels (vertical)×3 pixels (horizontal)) (the noise discrimination subject area indicated by hatching in FIG. 20) centered on the subject position A. If the subject position A is a black isolated point, the flow advances to step S612. Otherwise, the flow advances to step S607.

In step S607, similar to the sixth embodiment, whether the pixel value difference at the subject position of noise discrimination (e.g., the position A in FIG. 20) satisfies condition (2) described above is discriminated by checking whether the subject position A of noise discrimination is a white isolated point in the nine-pixel area (3 pixels (vertical)×3 pixels (horizontal)) (the noise discrimination subject area indicated by hatching in FIG. 20) centered on the subject position A. If the subject position A is a white isolated point, the flow advances to step S609. Otherwise, the flow advances to step S608.

In step S608, whether the pixel value difference (absolute value) at the subject position A of noise discrimination is larger than threshold value 1 is discriminated by referring to the binary image data stored in the bit map data holding area corresponding to the subject position A of noise discrimination and checking whether the pixel at the subject position A of noise discrimination is a black pixel. If the subject position A is a black pixel, the flow advances to step S609. Otherwise, the flow advances to step S612.

In step S609, the number of change pixels is increased by one to set a new number of change pixels. In step S610, it is checked whether the number of change pixels updated in step S609 is larger than predetermined threshold value 3. If YES in step S610, the flow advances to step S611. If NO in step S610, the flow advances to step S612.

In step S611, it is discriminated that an image change has occurred, and the processing in the flow chart of FIG. 23 is terminated. In step S612, it is checked whether all pixels have been processed. If YES in step S612, the flow advances to step S613 to discriminate that no image change has occurred. The processing in the flow chart of FIG. 23 is then terminated. If NO in step S612, the flow advances to step S614.

In step S614, processing is shifted to the next pixel. That is, both the pixel value difference calculation position and the subject position of noise discrimination are shifted to the next pixels to set a new subject pixel for noise discrimination. The flow then returns to step S602.

In the above processing, a nine-pixel area (3 pixels (vertical)×3 pixels (horizontal)) centered on a subject position of noised discrimination may include a portion where no corresponding binary image data exists, as in a case wherein the above subject position is at an end portion (upper, lower, left, or right end) of the image. In this case, this area is handled as white pixel data.

In the seventh embodiment, similar to the sixth embodiment, an image change can be detected without being affected by, e.g., change components produced randomly in the image because of flickering of a light source or mixing of noise in a photoelectric scanning unit, an electronic circuit unit, or the like. That is, an image change can be accurately detected.

The eighth embodiment of the present invention will be described next.

In the sixth and seventh embodiments described above, as subject pixel positions, two positions, i.e., "the subject position of noise discrimination" and "the pixel value difference calculation position" like the positions A and B in FIG. 20 are set, and an appropriate difference ((the number of pixels of an image in the main scanning direction)+two pixels) is set between the two positions. An image change is detected by performing raster scanning once for every still image. However, the present invention is not limited to this.

For example, raster scanning may be performed twice for every still image. In the first scanning operation, pixel value differences in one entire image are calculated, and binary image data representing a discrimination result indicating whether each calculated pixel value difference exceeds predetermined threshold value 1 is formed. In the second scanning operator for the same still image, noise discrimination and discrimination of the image as a change image may be performed.

In addition, the difference to be set between the two subject pixel positions (the subject position of noise discrimination and the pixel value difference calculation position) is not limited to ((the number of pixels of an image in the main scanning direction)+two pixels). For example, a difference of ((the number of pixels of an image in the main scanning direction)×2+three pixels) may be set.

In this case, erroneous extraction discrimination can be performed by referring to a 25-pixel area (5 pixels (vertical)×5 pixels (horizontal)) centered on the subject position of noise discrimination. For example, it is discriminated that a change component is erroneously extracted, if the central pixel in the 25-pixel area is a white pixel, but all the surrounding 24 pixels are black pixels, or if 22 or more pixels of the surrounding 24 pixels have values different from the value of the central pixel.

The ninth embodiment of the present invention will be described next.

Figure 24:
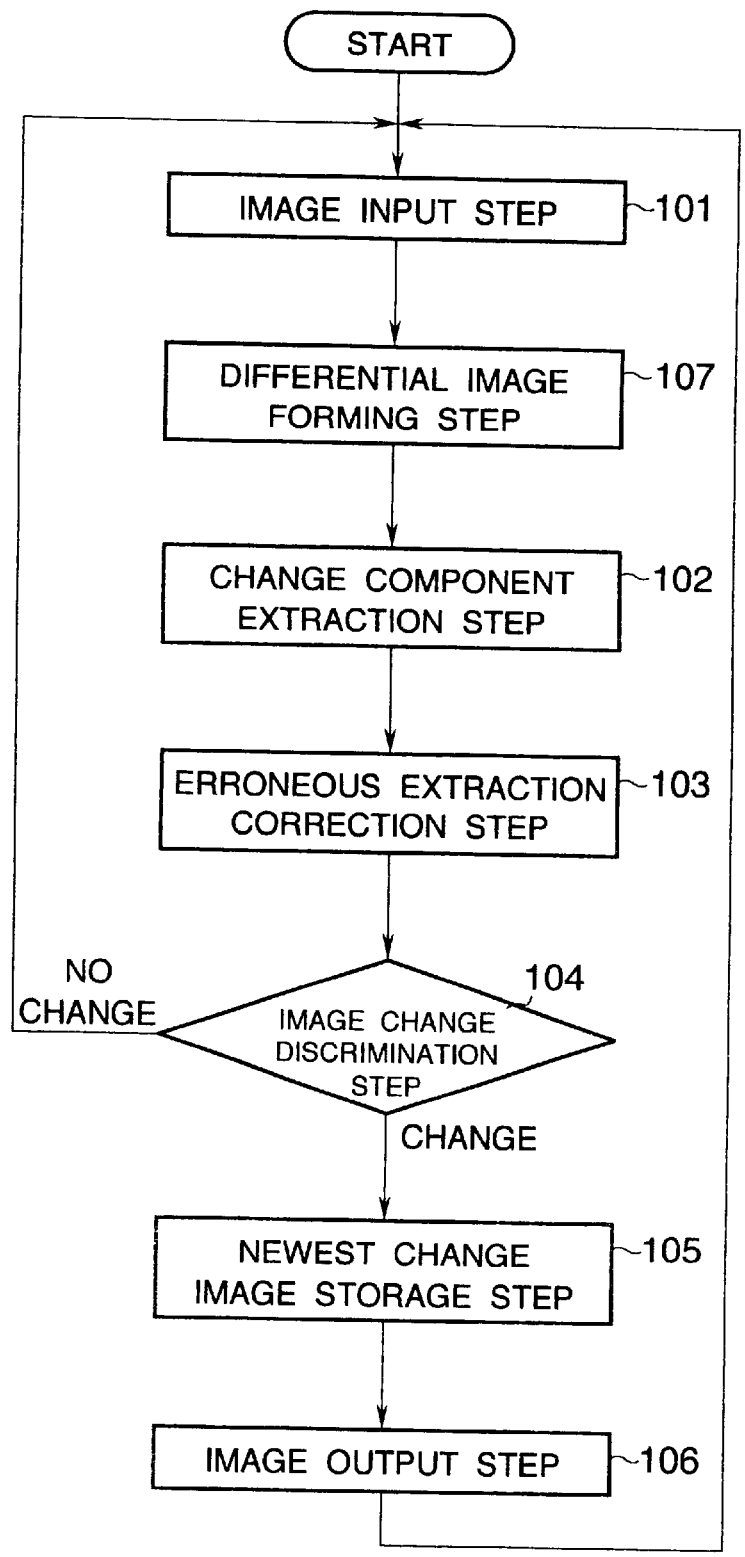
FIG. 24 is a flow chart showing the contents of an image processing method according to the eighth embodiment.

In the ninth embodiment, as shown in FIG. 24, differential image forming step 107 is inserted between image input step 101 and change component extraction step 102 in the procedure shown in FIG. 17 in the sixth to eighth embodiments.

In differential image forming step 107, differential processing using, e.g., a Sobel operator, is performed for an input image input in image input step 101 (an image having undergone differential processing will be referred to as a differential image hereinafter). Other processing steps 101 to 106 are performed in the same manner as in the sixth to eighth embodiments. However, in change component extraction step 102, the same processing as that in the sixth to eighth embodiment is performed not for an input image but for a differential image. In addition, in newest change image storage step 105, a differential image is stored instead of an input image.

With this operation, although the processing is complicated, the apparatus can be designed not to detect an image change due to a change in illumination. In some application of the present invention, it is preferable that an image change due to a change in illumination be not detected. A similar effect can be expected in the sixth to ninth embodiments as well depending on a method of setting threshold values. In this embodiment, however, there is no need to consider a change in illumination in setting a threshold value.

Figure 25:
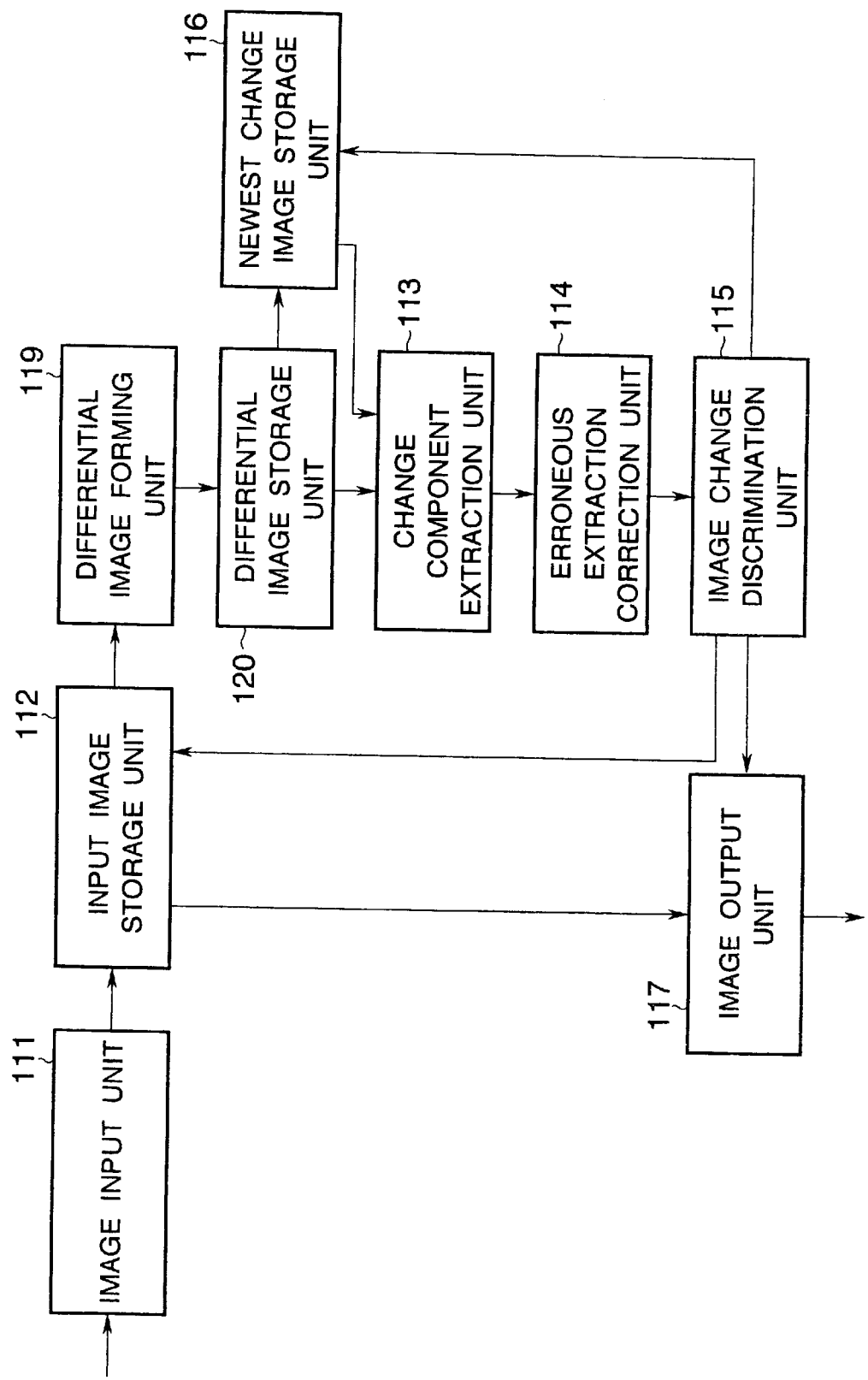
FIG. 25 is a block diagram showing an example of the arrangement of a motion image processing apparatus for performing the processing in FIG. 24.

FIG. 25 is a block diagram showing an example of a motion image processing apparatus for performing the processing in FIG. 24. Note that the arrangement shown in FIG. 25 can be realized by the hardware shown in FIG. 3, as in the sixth to ninth embodiments.

More specifically, a differential image forming unit 119 in FIG. 25 can be constituted by the CPU 21 which operates in accordance with programs stored in the ROM 22 or the RAM 23 in FIG. 3, and the RAM 23 used as work memory or the disk unit 24. The differential image forming unit 119 performs differential processing for an input image stored in an input image storage unit 112, and stores the resultant differential image in a differential image storage unit 120.

In addition, for example, the differential image storage unit 120 can be constituted by the RAM 23 or the disk unit 24 in FIG. 3, similar to the input image storage unit 112 and a newest change image storage unit 116 in FIG. 25. As is apparent, the respective storage units 112, 116, and 120 may be constituted by dedicated storage devices.

The remaining means in FIG. 25 are the same as those in the sixth to ninth embodiments. However, a change component extraction unit 113 performs the same processing as that in the sixth to ninth embodiments with respect to a differential image stored in the differential image storage unit 120 instead of an input image stored in the input image storage unit 112. The newest change image storage unit 116 does not store an input image stored in the input image storage unit 112 as a newest change image but stores a differential image stored in the differential image storage unit 120.

Figure 26:
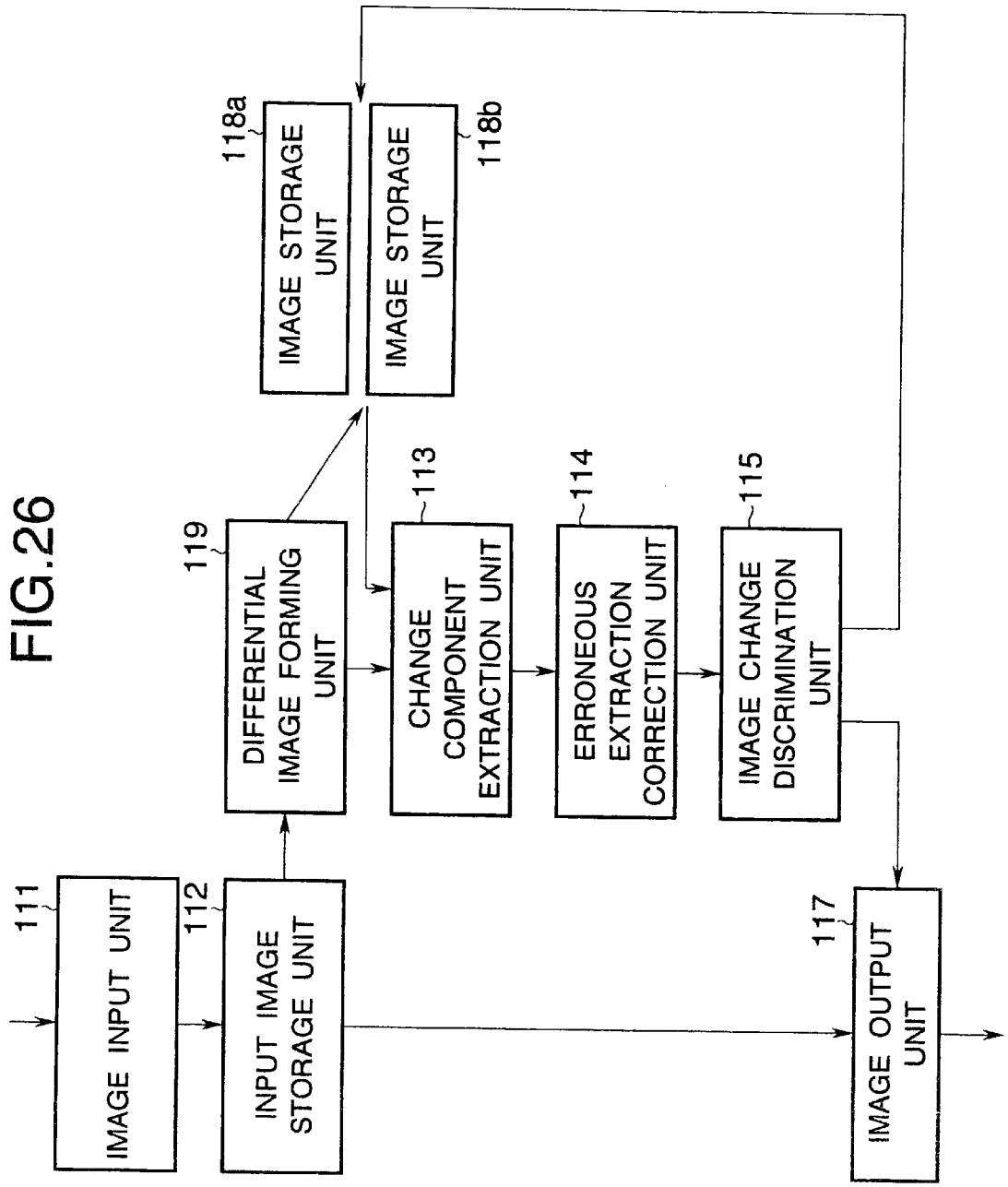
FIG. 26 is a block diagram showing another example of the arrangement of the motion image processing apparatus for performing the processing in FIG. 24.

The arrangement shown in FIG. 25 may be replaced with the arrangement shown in FIG. 26, as in the sixth to ninth embodiments. More specifically, the operation mode of the differential image storage unit 120 and the newest change image storage unit 116 in FIG. 25 can be changed such that two image storage units 118a and 118b are selectively used upon a switching operation, as shown in FIG. 26. With this arrangement, the processing of copying a differential image from the differential image storage unit 120 to the newest change image storage unit 116, which is performed in the case shown in FIG. 25, can be omitted.

The first to ninth embodiments can be effectively applied to video conference systems and monitoring systems.

The present invention can be practiced in other various forms without departing from its spirit and scope.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) a signal inputter, arranged to input a continuous image signal;
   b) a changed component extractor, arranged to extract changed components between images by comparing the image signal inputted by said signal inputter with a reference image signal;
   c) an erroneous extraction correction unit, arranged to detect and remove an erroneously extracted changed component from the changed components extracted by said changed component extractor; and
   d) an image change discriminator, arranged to discriminate an image change in the image signal based on the changed components as corrected by said erroneous extraction correction unit.

2. An apparatus according to claim 1, further comprising a signal storer, arranged to update/store the image signal as the reference image signal in accordance with an output from said image change discriminator.

3. An apparatus according to claim 1, further comprising a signal outputter, arranged to externally output the image signal, in accordance with an output from said image change discriminator.

4. An apparatus according to claim 1, wherein said image processing apparatus is applied to a video conference system.

5. An apparatus according to claim 1, wherein said image processing apparatus is applied to a monitoring system.

6. An image processing method comprising:
   a) an input step of inputting an image signal;
   b) a changed component extraction step of extracting changed components between images by comparing the inputted image signal with a reference image signal, the reference image signal being a previously inputted signal, inputted in said input step, when a most recent prior changed component is extracted in said changed component extraction step;
   c) an erroneous extraction correction step of correcting the changed components extracted in said changed component extracting step by detecting and removing an erroneously extracted changed component from the changed components extracted in said changed component extraction step; and
   d) an image change discrimination step of discriminating an image change in the image signal based on the changed components as corrected in said erroneous extraction correction step.

* * * * *